(12) United States Patent
Takada et al.

(10) Patent No.: US 8,136,221 B2
(45) Date of Patent: Mar. 20, 2012

(54) METHOD OF MANUFACTURING COIL FOR STATOR INCORPORATED IN ROTARY ELECTRIC MACHINE

(75) Inventors: Masahiro Takada, Okazaki (JP); Akito Akimoto, Kariya (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 547 days.

(21) Appl. No.: 12/427,210

(22) Filed: Apr. 21, 2009

(65) Prior Publication Data

US 2009/0260219 A1 Oct. 22, 2009

(30) Foreign Application Priority Data

Apr. 21, 2008 (JP) ................................. 2008-110790
Apr. 17, 2009 (JP) ................................. 2009-101261

(51) Int. Cl.
*H02K 15/00* (2006.01)
*H02K 15/08* (2006.01)
(52) U.S. Cl. ............. 29/596; 29/605; 310/180; 310/184
(58) Field of Classification Search ............ 29/735–736, 29/596–598, 33 F, 825, 602.1, 605; 310/179–194, 310/201
See application file for complete search history.

(56) References Cited

U.S. PATENT DOCUMENTS

| | | | |
|---|---|---|---|
| 1,340,712 A * | 5/1920 | Hare ........................... | 242/395.1 |
| 4,351,102 A * | 9/1982 | Grozinger et al. .............. | 29/596 |
| 6,140,735 A * | 10/2000 | Kato et al. .................... | 310/201 |
| 6,376,961 B2 * | 4/2002 | Murakami et al. ............ | 310/184 |
| 6,455,972 B1 * | 9/2002 | Asao et al. .................... | 310/184 |
| 6,501,205 B1 * | 12/2002 | Morishita et al. ............. | 310/184 |
| 6,707,211 B2 * | 3/2004 | Oohashi et al. ............... | 310/179 |
| 6,760,965 B2 * | 7/2004 | Asao et al. ....................... | 29/596 |
| 6,865,796 B1 * | 3/2005 | Oohashi et al. ................. | 29/596 |
| 6,951,054 B2 * | 10/2005 | Hirota et al. .................... | 29/596 |
| 7,225,525 B2 * | 6/2007 | Yamamoto et al. ............. | 29/596 |
| 7,337,525 B2 * | 3/2008 | Ueda et al. ...................... | 29/596 |
| 7,365,467 B2 * | 4/2008 | Bramson et al. ............. | 310/180 |
| 7,386,931 B2 * | 6/2008 | Neet et al. ....................... | 29/596 |
| 7,546,672 B2 * | 6/2009 | Murase .......................... | 29/596 |
| 7,804,217 B2 * | 9/2010 | Hasegawa et al. ............ | 310/179 |

(Continued)

FOREIGN PATENT DOCUMENTS

JP 03-237704 10/1991

(Continued)

OTHER PUBLICATIONS

US Patent Application of Kouda et al, U.S. Appl. No. 12/323,852, filed Nov. 26, 2008.

(Continued)

*Primary Examiner* — Derris Banks
*Assistant Examiner* — Kaying Kue
(74) *Attorney, Agent, or Firm* — Nixon & Vanderhye PC

(57) ABSTRACT

A method is provided for manufacturing a stator coil for a rotary electric machine, which is formed by winding up a plurality of phase wires. The method includes a shaping step for shaping a plurality of shaped wire members from electrically conductive wires, an integrating step for integrating the plurality of shaped wire members with each other to form an integrated body, and a winding-up step for winding the integrated body about a core member to form a wound body. At the winding-up step, curve forming is performed by plastically deforming turn portions of the integrated body into a curved shape, during conveyance of feeding the integrated body to the core member.

12 Claims, 16 Drawing Sheets

U.S. PATENT DOCUMENTS

| | | | |
|---|---|---|---|
| 7,812,498 B2* | 10/2010 | Kouda | 310/201 |
| 7,856,701 B2* | 12/2010 | Hirota et al. | 29/596 |
| 7,948,143 B2* | 5/2011 | Nakamura | 310/201 |
| 7,952,250 B2* | 5/2011 | Hasegawa et al. | 310/179 |
| 8,008,830 B2* | 8/2011 | Kouda et al. | 310/201 |
| 2001/0019234 A1* | 9/2001 | Murakami et al. | 310/180 |
| 2001/0047580 A1* | 12/2001 | Stratico et al. | 29/596 |
| 2002/0030417 A1* | 3/2002 | Asao | 310/201 |
| 2002/0092152 A1* | 7/2002 | Asao et al. | 29/596 |
| 2004/0207282 A1* | 10/2004 | Ueda et al. | 310/184 |
| 2006/0097606 A1* | 5/2006 | Miyatake et al. | 310/270 |
| 2007/0180682 A1* | 8/2007 | Ueda et al. | 29/596 |
| 2007/0271767 A1* | 11/2007 | Murase | 29/596 |
| 2008/0179983 A1* | 7/2008 | Hasegawa et al. | 310/179 |
| 2009/0146523 A1 | 6/2009 | Kouda et al. | |
| 2009/0260219 A1* | 10/2009 | Takada et al. | 29/596 |
| 2009/0261685 A1* | 10/2009 | Akimoto et al. | 310/207 |
| 2010/0064505 A1* | 3/2010 | Takada et al. | 29/596 |
| 2010/0077599 A1* | 4/2010 | Tokizawa | 29/596 |
| 2010/0141078 A1* | 6/2010 | Kouda et al. | 310/195 |
| 2010/0187938 A1* | 7/2010 | Yamamoto et al. | 310/195 |
| 2010/0229374 A1* | 9/2010 | Hashimoto et al. | 29/596 |
| 2010/0244615 A1* | 9/2010 | Kouda | 310/215 |
| 2011/0041318 A1* | 2/2011 | Akimoto et al. | 29/596 |
| 2011/0099797 A1* | 5/2011 | Mishina et al. | 29/596 |

FOREIGN PATENT DOCUMENTS

| | | |
|---|---|---|
| JP | 2000-139048 | 5/2000 |
| JP | 2002-176752 | 6/2002 |
| JP | 2003-324911 | 11/2003 |
| JP | 2004-320886 | 11/2004 |

OTHER PUBLICATIONS

Japanese Office Action dated Jan. 19, 2010, issued in corresponding Japanese Application No. 2009-101261, with English translation.

* cited by examiner (A)

(B)

(C)

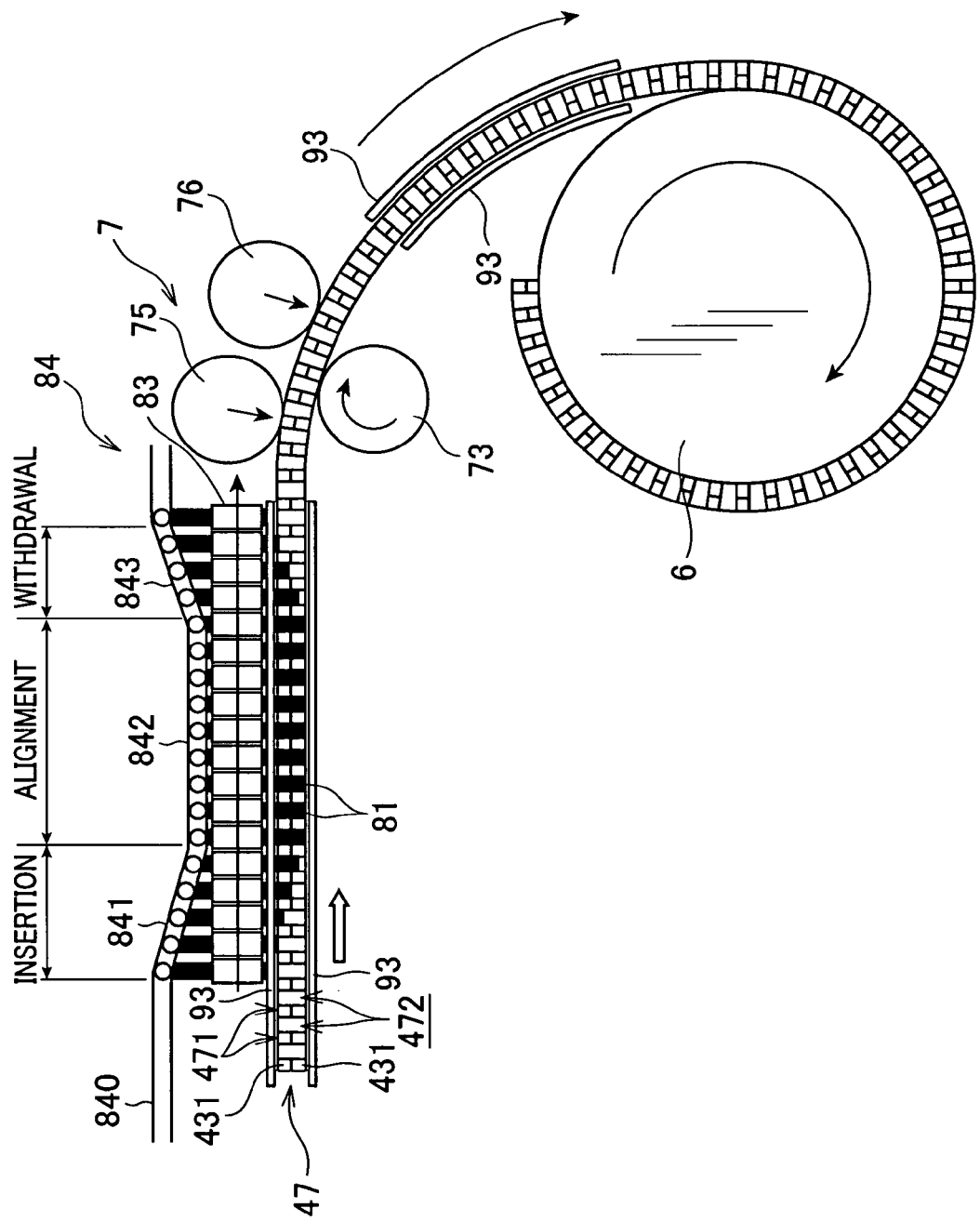

METHOD OF MANUFACTURING COIL FOR STATOR INCORPORATED IN ROTARY ELECTRIC MACHINE

CROSS-REFERENCE TO RELATED APPLICATION

This application is based on and claims the benefit of priority from earlier Japanese Patent Application Nos. 2008-110790 filed on Apr. 21, 2008 and 2009-101261, filed on Apr. 17, 2009, the description of which is incorporated herein by reference.

BACKGROUND OF THE INVENTION

1. Technical Field of the Invention

The present invention relates to a method for manufacturing a coil for a stator loaded on a rotary electric machine, and in particular, to a method for manufacturing a coil called a stator coil wound about such a stator.

2. Related Art

In recent years, small size, high power and high quality have been demanded of rotary electric machines, such as electric motors and electric generators. Taking rotary electric machines loaded on vehicles as an example, the space for loading such a rotary electric machine has been reduced more and more, while the output has been required to be more enhanced.

Under such circumstances, rotary electric machines that have been known include one which is provided with a stator having a stator coil formed of continuous windings, as disclosed in Japanese Patent Laid-Open Publication Nos. 2002-176752 and 2004-320886.

An example of a method for manufacturing a stator coil consisting of continuous windings is provided below.

First, a plurality of shaped wire members are produced from electrically conductive wires, in each of which a plurality of linear portions are juxtaposed being connected with each other via a plurality of turn portions. Each of the turn portions has a staircase portion that has been bent into a staircase shape by plastic deformation. In each staircase portion, the stair case shape is provided toward the linear portions connected by the turn portion. These shaped wire members are integrated with each other to provide an integrated body. In each pair of shaped wire members consisting the integrated body, the plurality of linear portions of one shaped wire member are superposed on the respective plurality of linear portions of the other shaped wire member to form a plurality of linear superposition portions in the longitudinal direction of the integrated body. Thus, the plurality of linear superposition portions are juxtaposed in the integrated body, in the longitudinal direction of the integrated body. The turn portions in the integrated body are curved using plastic deformation so as to have a predetermined winding radius, while the integrated body is wound up by a predetermined number of turns about a core member to form a wound body. In the wound body, the plurality of linear superposition portions in each pair of shaped wire members are radially stacked to form a plurality of linear stack portions in the circumferential direction.

The wound body obtained in this way is disposed in a stator core so that the linear stack portions are located in respective slots of the stator core, with the turn portions being disposed outside the slots, to thereby provide a stator coil.

However, the above manufacturing method causes a difficulty, as explained blow, in winding up the integrated body about the core member with the predetermined winding radius.

Specifically, in the integrated body, each pair of the shaped wire members constructing the integrated body are superposed with each other at the turn portions. Also, the turn portions in each pair of the shaped wire members are each bent into a staircase shape toward the linear portions. Since the turn portions bent into the staircase shape are work-hardened due to the plastic deformation, further plastic deformation of the turn portions is difficult by that much corresponding to the degree of the work hardening. Therefore, it is difficult to reliably wind up the integrated body about a core member, while bending the turn portions so as to have the predetermined winding radius, using plastic deformation. Moreover, the fact that the shape of each turn portion is complicated by the presence of the staircase portion makes it more difficult for the integrated body to be wound up about the core member.

For this reason, the wound body is likely to suffer from a larger winding radius than a desired dimension, from disarray in the staircase portions in the turn portions, from uneven intervals between adjacent linear stack portions, or from misalignment in the plurality of linear superposition portions in the respective linear stack portions. When the linear stack portions of such a stator coil are arranged in the respective slots of the stator core, the accuracy may be deteriorated in the alignment of the linear portions in each slot, the intervals (pitch) may become uneven between the linear stack portions in adjacent slots, or the turn portions projected from the end faces of the stator core are likely to interfere with each other. The deterioration in the alignment accuracy of the linear portions, or the uneven pitch may lead to the deterioration in the slot occupancy in the stator, or to the deterioration in the output of the rotary electric machine using the stator. In addition, the interference between the turn portions may lead to the increase in the size of the stator.

SUMMARY OF THE INVENTION

The present invention has been made in light of the circumstances described above, and has as its object of enabling reliable winding of an integrated body having turn portions, each bent into a staircase shape, about a core member, and of enhancing the accuracy in the alignment and pitch in linear stack portions, as well as the accuracy in the array in staircase portions of the respective turn portions in a wound body, in manufacturing a stator coil for a rotary electric machine by winding up phase windings consisting of continuous windings.

A method for manufacturing a stator coil loaded on a rotary electric machine related to the present invention, which is a method for manufacturing a stator coil formed by winding up a plurality of phase wires, characterized in that the method comprises a shaping step of shaping a plurality of shaped wire members from electrically conductive wires, an integrating step of integrating a plurality of the shaped wire members to form an integrated body, and a winding-up step of winding the integrated body about a core member to form a wound body; the shaped wire members each have a plurality of linear portions extending parallel to each other and juxtaposed in a longitudinal direction of the integrated body and a plurality of turn portions for connecting the adjacent linear portions with each other alternately on one end side and on the other end side of the linear portions; the shaped wire members each have a plurality of linear superposition portions in the longitudinal direction of the integrated body, the linear superposition portions each being formed by superposing the linear portions on each other; the wound body obtained at the winding-up step has a plurality of linear stack portions in a circumferential direction of the wound body, the linear stack portions each being formed by stacking a plurality of the linear superposition portions in a radial direction; and, at the winding-up step, curve forming is performed by plastically deforming the integrated body into a curved shape during conveyance of feeding the integrated body to the core member.

At the winding-up step in the inventive method for manufacturing a stator coil, the turn portions of the integrated body is plastically deformed into a curved shape during the conveyance of feeding the integrated body to the core member. During the curve forming, the turn portions are curved into a curved shape. The turn portions are thus plastically deformed to perform curve forming, being independent of the winding of the integrated body about the core member. Thus, the turn portions having staircase portions can be reliably and easily subjected to curve forming to provide a predetermined curved shape. Then, the core member can wind up the integrated body whose turn portions have already been formed into a curved shape. Accordingly, the integrated body can be reliably wound about the core member. Thus, it is possible, in the obtained wound body, to suppress the winding radius from becoming larger than a desired dimension, to suppress the staircase portions in the turn portions from being disarrayed, to suppress the adjacently located linear stack portions from having uneven intervals, or to suppress the superposition of the plurality of linear portions in each linear stack portion from being deviated. Thus, the accuracy can be enhanced in the alignment and the pitch in the linear stack portions of the wound body, and at the same time, the accuracy can also be enhanced in the array of the staircase portions of the turn portions.

It is preferred that, at the winding-up step, a relationship of R≦r is established between a curvature radius R at the time of performing curve forming with plastic deformation during the conveyance of feeding the integrated body to the core member at the winding-up step, and a winding radius r used in winding the turn portions of the integrated body about the core member. With this configuration, the curve forming is performed by curving the turn portions into a curved round shape having a curvature radius R corresponding to a winding radius equals to or less than r for the core member. Since the curve forming is performed by plastically deforming the turn portions, being independent of the winding of the integrated body about the core member, the turn portions having the staircase portions can be reliably and easily subjected to curve forming to provide a curved round shape having the predetermined curvature radius R. Thus, the core member can wind up the integrated body whose turn portions have already been curved into a curved round shape having the curvature radius R corresponding to the winding radius equals to or less than r. In this way, the integrated body can be reliably wound about the core member.

It is preferred that, at the winding-up step, a relationship of R<r is established between the curvature radius R and the winding radius r. With this configuration, the curve forming is performed by curving the turn portions into the curved round shape having the curvature radius R smaller than the winding radius r for the core member. Since the turn portions are plastically deformed to form a curve, being independent of the winding of the integrated body about the core member, the turn portions having the staircase portions can be reliably and easily subjected to curve forming to provide a curved round shape having the predetermined curvature radius R. Then, the core member can wind up the integrated body whose turn portions have already been curved into a curved round shape having the curvature radius R smaller than the winding radius r. The integrated body can be reliably wound about the core member.

It is preferred that, at the winding-up step, the integrated body is wound about the core member by a plurality of number of turns to obtain the wound body, the curvature radius R being changed in accordance with the winding radius that changes with each turn.

With this configuration, the curvature radius R is changed in accordance with the winding radius that changes with each turn. Therefore, the integrated body can be reliably wound about the core member. Thus, the accuracy can be further enhanced in the alignment and the pitch in the linear stack portions of the wound body in the obtained wound body.

It is preferred that the curve forming is performed by sandwiching the turn portions of the integrated body between a convex tool having a convex curve-forming face and a concave tool having a concave curve-forming face.

With this configuration, curve forming for the turn portions can be carried out using an apparatus having a simple structure.

It is preferred that the turn portions are sandwiched between the convex curve-forming face and the concave curve-forming face, with an elastically deformable convex pressing plate for covering the convex curve-forming face being interposed between the convex curve-forming face and the return portions, and an elastically deformable concave pressing plate for covering the concave curve-forming face being interposed between the concave curve-forming face and the return portions.

With this configuration, the convex curve-forming face and the concave curve-forming face can be prevented from coming into contact with the turn portions, using the convex pressing plate or the concave pressing plate. Therefore, the turn portions can be prevented from suffering from the damage that could be caused by permitting the convex curve-forming face to contact with the concave curve-forming face.

It is preferred that at least one of the concave tool and the convex tool has an alignment pin that can be inserted into a gap formed between the linear superposition portions adjacent to each other in the integrated body; and the turn portions are sandwiched between the convex curve-forming face and the concave curve-forming face, with the insertion of the alignment pin into the gap.

With this configuration, the curve forming of the turn portions can be performed, while the integrated body is placed in position by the alignment pin in the longitudinal direction of the integrated body. Thus, the accuracy can be further enhanced in the alignment and the pitch in the linear stack portions of the wound body, and at the same time, the accuracy can be further enhanced in the array in the staircase portions of the turn portions.

It is preferred that the turn portions of the integrated body are sandwiched between a first metal roller disposed inside a curve to be formed and an elastic roller disposed outside the curve to be formed, for the application of a pressure.

With this configuration, the turn portions can be suppressed from suffering from damage that could be caused by the curve forming, compared with the case where the turn portions are subjected to curve forming being sandwiched between metal rollers.

It is preferred that the turn portions of the integrated body are sandwiched between a first metal roller disposed inside a curve to be formed and second and third metal rollers disposed outside the curve to be formed, for the application of a pressure.

With this configuration, the life of the rollers will be lengthened compared with the case where elastic rollers are used.

It is preferred that, at the winding-up step, preliminary alignment members are inserted into and withdrawn from respective gaps formed between the linear superposition portions adjacent to each other in the integrated body, during the conveyance of feeding the integrated body to the core member.

With this configuration, the preliminary alignment members are inserted into and withdrawn from the respective gaps formed between the plurality of linear superposition portions of the integrated body, preceding or following the curve forming of the turn portions of the integrated body which is being conveyed, during the conveyance of feeding the integrated body to the core member.

For example, in the case where the preliminary alignment members are inserted into or withdrawn from at least two consecutive gaps, the superposition of the linear portions can be aligned in at least the linear superposition portion sandwiched between the preliminary alignment members, so that the linear portions can be aligned in advance in the direction of superposition. In the case where the preliminary alignment members are inserted into or withdrawn from at least three consecutive gaps, the superposition of the linear portions can be justified in the linear superposition portions each sandwiched between the preliminary alignment members, so that the linear portions can be aligned in advance in the direction of superposition. At the same time, the intervals between the adjacent linear superposition portions can be uniformed in advance. Accordingly, the staircase portions of the turn portions connecting the linear portions can be suppressed from being disarrayed. Thus, in the case where the preliminary alignment is performed preceding the curve forming of the turn portions, the turn portions can be suppressed from suffering from damage that could be caused by the interference between the turn portions during the curve forming. At the same time, the curve forming can be more reliably conducted for the turn portions. On the other hand, in the case where the preliminary alignment is performed following the curve forming of the turn portions, more reliable winding can be performed for the core member.

In this way, according to the inventive method for forming a stator coil, the integrated body having the turn portions each formed into a staircase shape can be reliably wound up about the core member, in manufacturing the stator coil by winding phase windings each made up of a continuous winding. Also, the accuracy can be improved in the alignment and the pitch in the linear stack portions of the wound body, and at the same time, the accuracy can be improved in the array in the staircase portions of the turn portions.

Thus, applying the stator coil obtained by the inventive method for manufacturing a stator coil to the stator of a rotary electric machine, the linear stack portions of the wound body can be reliably accommodated in the respective slots of the stator core. In addition, improvement can be achieved in the slot occupancy in the stator, or in the output of the rotary electric machine using the stator.

Further, the axial dimension or the like of the stator can be suppressed from being increased.

In addition, productivity of the stator can be enhanced because the linear stack portions of the wound body can be easily accommodated in the respective slots.

BRIEF DESCRIPTION OF THE DRAWINGS

In the accompanying drawings:

FIG. 17 is a schematic view illustrating a method for manufacturing a stator coil according to a fourth embodiment of the present invention.

DETAILED DESCRIPTION OF THE PREFERRED EMBODIMENTS

With reference to the accompanying drawings, hereinafter will be described in detail some embodiments of a method for manufacturing a stator coil for an electric rotary machine of the present invention. It should be appreciated that the embodiments described below are only examples, and thus the method for manufacturing a stator coil for an electric rotary machine of the present invention is not intended to be limited only to these embodiments. The method for manufacturing a stator coil for an electric rotary machine of the present invention may be implemented in various modes that a person skilled in the art can obtain from modification and improvement, for example, of the present invention, without departing from the spirit of the present invention.

(First Embodiment)

Referring to FIGS. 1 to 13, hereinafter is described a configuration of a rotary electric machine 1 employing a stator coil obtained through a method for manufacturing a stator coil for an electric rotary machine according to a first embodiment. The rotary electric machine 1 may serve, for example, as an electric motor, an electric generator and a motor generator for vehicles.

Figure 1:
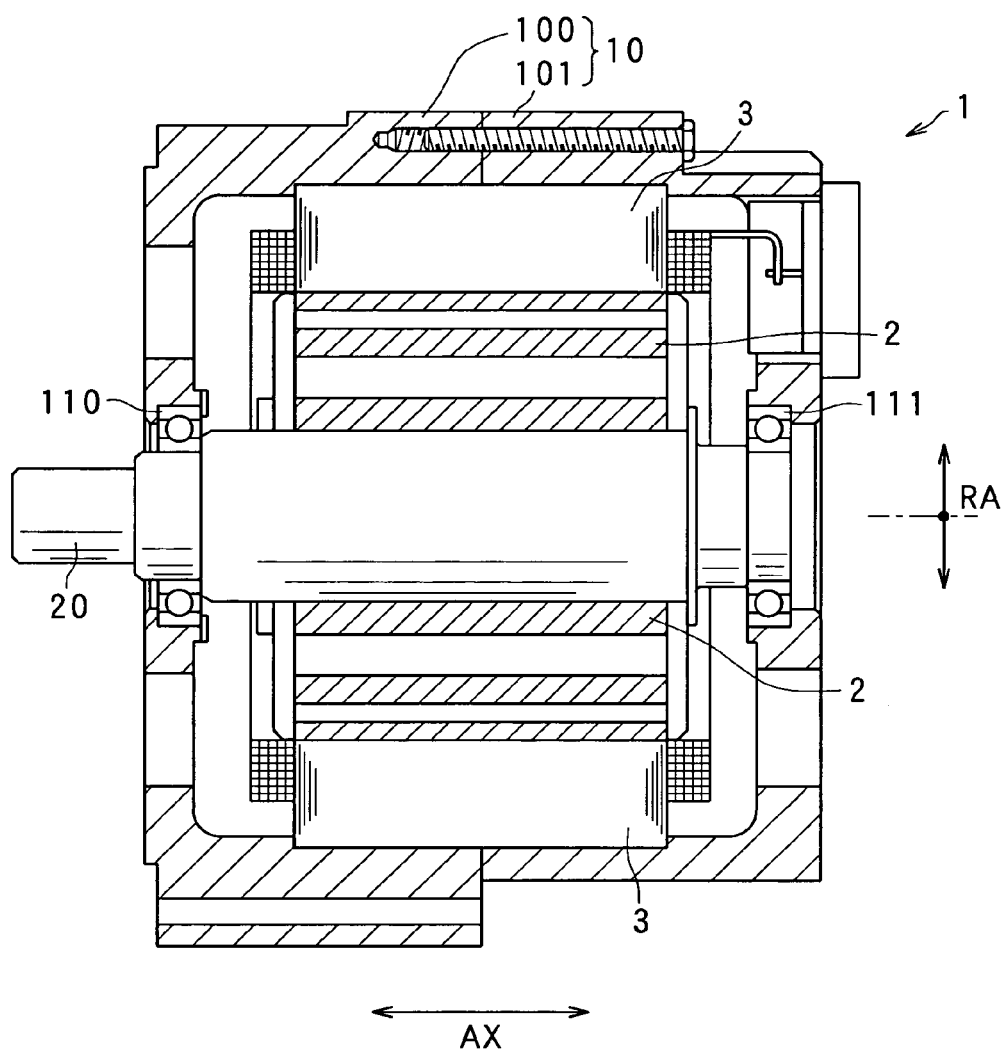
FIG. 1 is a schematic axial cross-sectional view illustrating a configuration of a rotary electric machine according to a first embodiment of the present invention.

As shown in FIG. 1, the rotary electric machine 1 includes: a housing 10 having a pair of substantially bottomed cylindrical housing members 100, 101 whose opening portions are joined with each other; a rotary shaft 20 rotatably supported by the housing 10 via bearings 110, 111; a rotor 2 secured to the rotary shaft 20; and a stator 3 secured to the housing 10 at a position in the housing 10, where the stator can enclose the rotor 2. In the description of the rotary electric machine 1, the direction along the rotary shaft 20 is referred to as an axial direction AX, the direction that goes around the axial direction AX is referred to as a circumferential direction CR, and the direction radially extending from the rotary shaft 20 along a plane perpendicular to the axial direction AX is referred to as a radial direction RA.

The rotor 2 includes permanent magnets forming, in the circumferential direction CR, a plurality of alternately differentiated poles on the outer peripheral side that faces the inner peripheral side of the stator 3. The number of the poles of the rotor 2 depends on the rotary electric machine concerned, and thus is not limited. The present embodiment uses an eight-pole (four N poles and four S poles) rotor.

Figure 2:
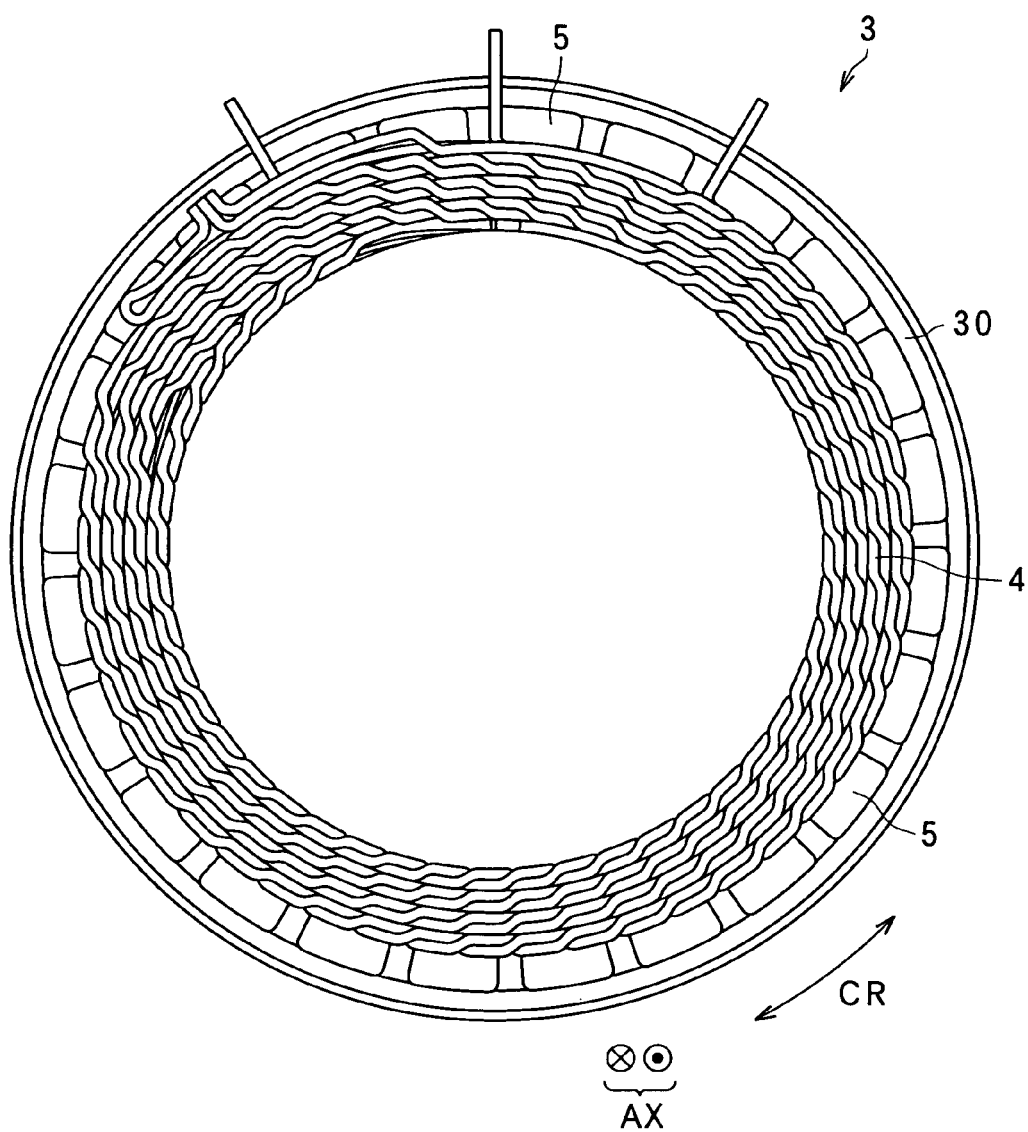
FIG. 2 is a plan view illustrating a stator according to the first embodiment.

As shown in FIG. 2, the stator 3 is configured by a stator core 30, a three-phase stator coil 4 formed of a plurality of phase windings, and insulating paper 5 disposed between the stator core 30 and the stator coil 4.

Figure 3:
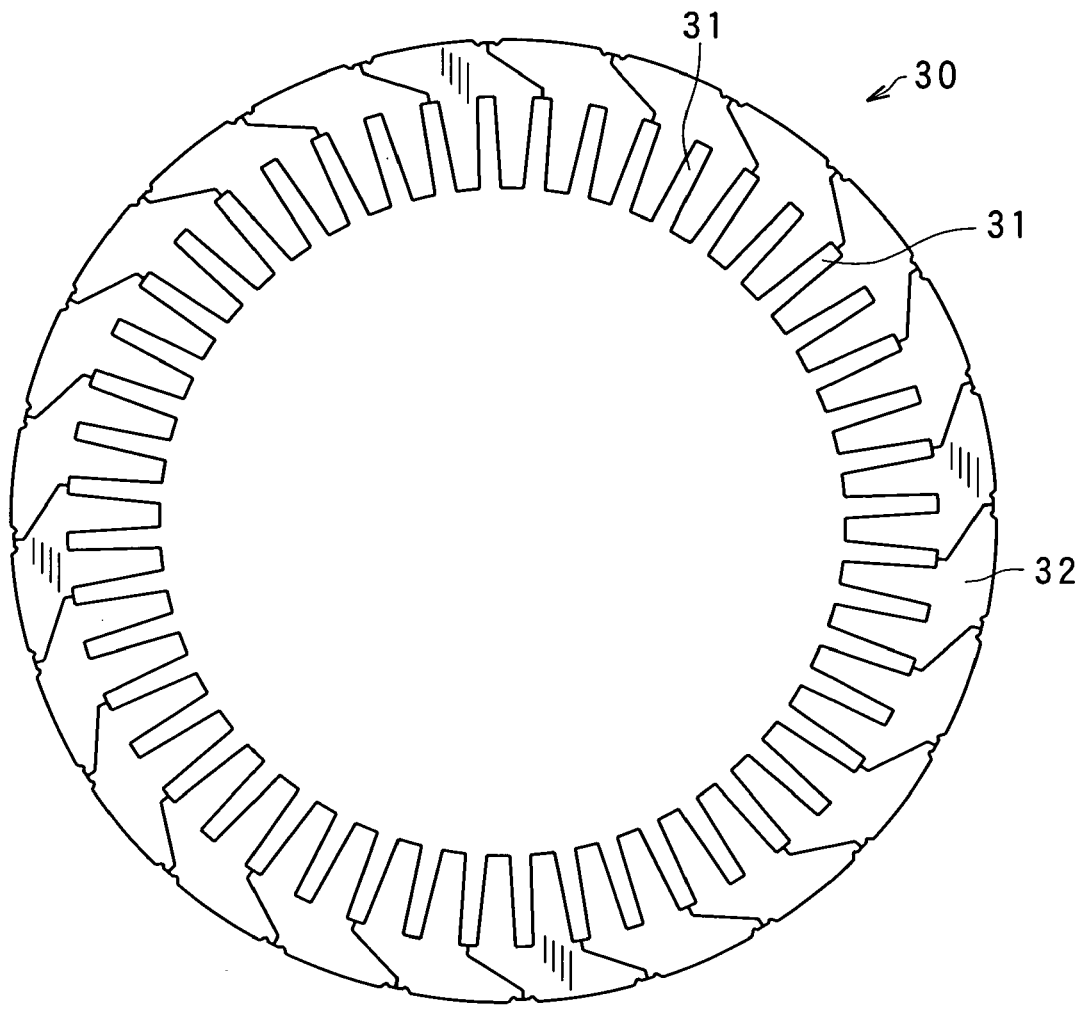
FIG. 3 is a plan view illustrating a stator core according to the first embodiment.

As shown in FIG. 3, the stator core 30 has an annular shape, with a plurality of slots 31 being formed in its inner peripheral face. The plurality of slots 31 are formed so that their depth-wise direction coincides with the radial direction RA. The number of the slots 31 formed in the stator core 30 is set in such a way that two slots are allocated to one phase of the stator coil 4, for each of the poles of the rotor 2. Accordingly, in the present embodiment, forty-eight slots are formed as derived from: 8×3×2=48.

Figure 4:
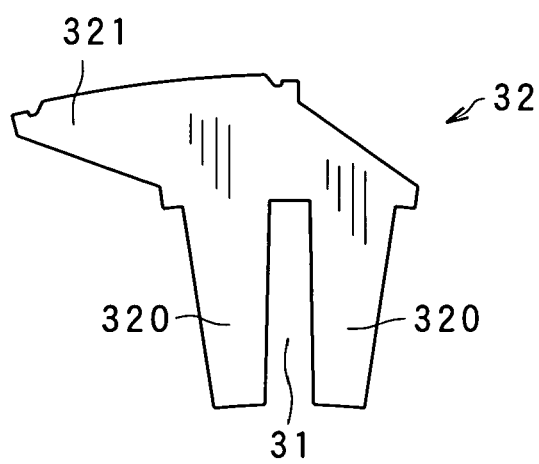
FIG. 4 is a plan view illustrating a laminated segment core according to the first embodiment.

The stator core 30 is formed by connecting, in the circumferential direction CR, a predetermined number (twenty-four in the present embodiment) of segment cores 32 shown in FIG. 4. Each segment core 32 defines one slot 31, and at the same time, the segment cores 32 adjacently located in the circumferential direction CR define one slot 31. Specifically, each segment core 32 has a pair of teeth 320 extending inward in the radial direction RA and a back core 321 connecting the teeth 320 with each other on an outer side in the radial direction RA.

The segment cores 32 configuring the stator core 30 are each formed by laminating four-hundred and ten electromagnetic steel plates each having a thickness of 0.03 mm. An insulating film is disposed between the laminated electromagnetic steel plates. The segment cores 32 configuring the stator core 30 may not only be formed of such a laminated body of electromagnetic steel plates, but may also be formed of known thin metal sheets and insulating films.

Figure 5A:
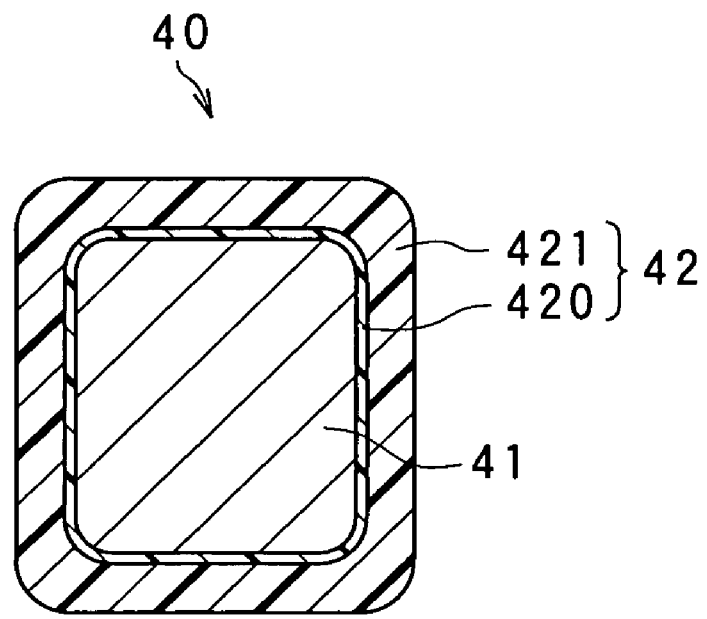
FIGS. 5A and 5B are cross sectional views each illustrating a winding configuring a stator coil which is applicable to the first embodiment.

The stator coil 4 is configured by winding up a plurality of windings 40 using a predetermined winding method. As shown in FIG. 5A, each of the windings 40 configuring the stator coil 4 is formed of a copper conductor 41 and an insulating film 42 consisting of an inner layer 420 and an outer layer 421 which cover the outer periphery of the conductor 41 for insulation. The thickness of the insulating film 42, i.e. the total thickness of the inner and outer layers 420, 421, is set to fall in a range of 100 μm to 200 μm. Thus, the insulating film 42 consisting of the inner and outer layers 420, 421 has a large thickness, which negates the need for inserting pieces of insulating paper between the windings 40 in order to establish insulation therebetween. However, pieces of insulating paper may be disposed between the windings 40, or between the stator core 30 and the stator coil 4 as shown in FIG. 2.

Figure 5B:
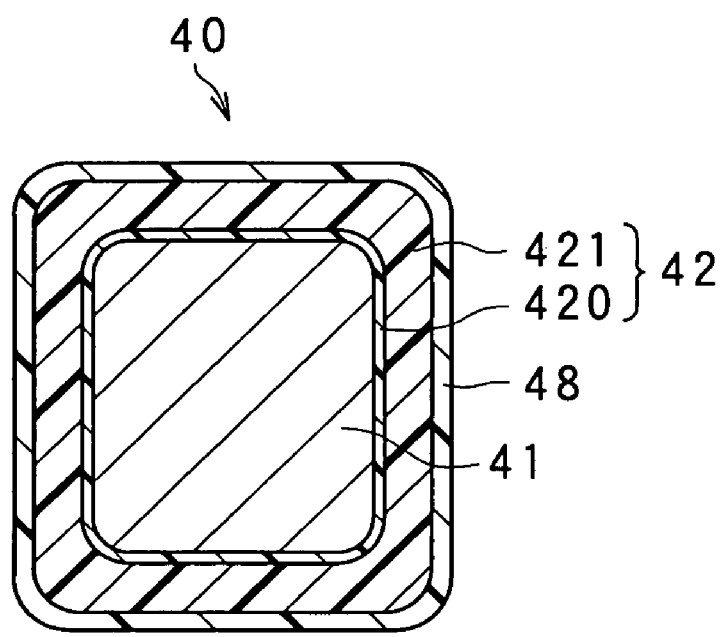

As shown in FIG. 5B, a fusing material 48 made such as of an epoxy resin may be coated on the outer periphery of the insulating film 42 consisting of the inner and outer layers 420 and 421, to form each winding 40 of the stator coil 4. In this case, the fusing material 48 will be melted faster than the insulating film 42 by the heat generated from the rotary electric machine 1. Therefore, the plurality of windings 40 disposed in the same slot 31 are thermally adhered to each other by the fusing material 48. As a result, the plurality of windings 40 disposed in the same slot 31 are integrated to turn the windings 40 to a rigid body, whereby the mechanical strength of the windings 40 in the slot 31 is enhanced.

Figure 6:
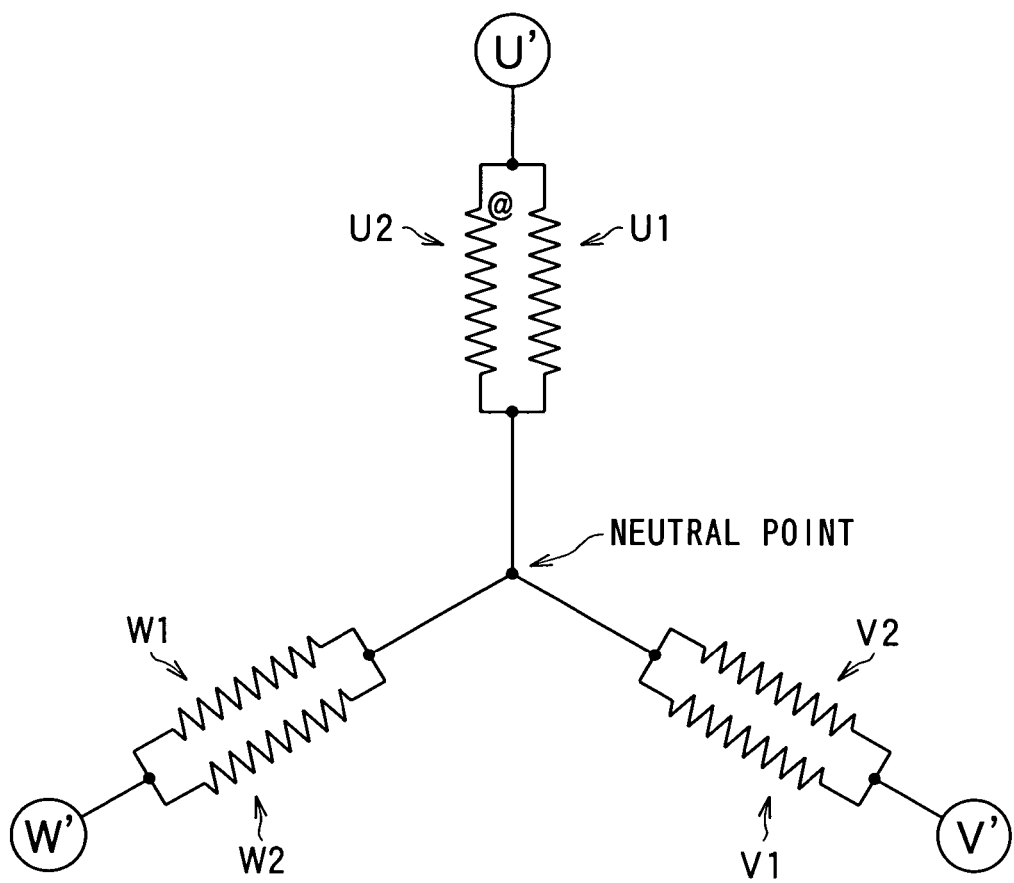
FIG. 6 is a view illustrating connection of a stator coil according to the first embodiment.

As shown in FIG. 6, the stator coil 4 is formed of three-phase windings (U1, U2, V1, V2, W1, W2), each phase being made up of two wires.

Figure 7:
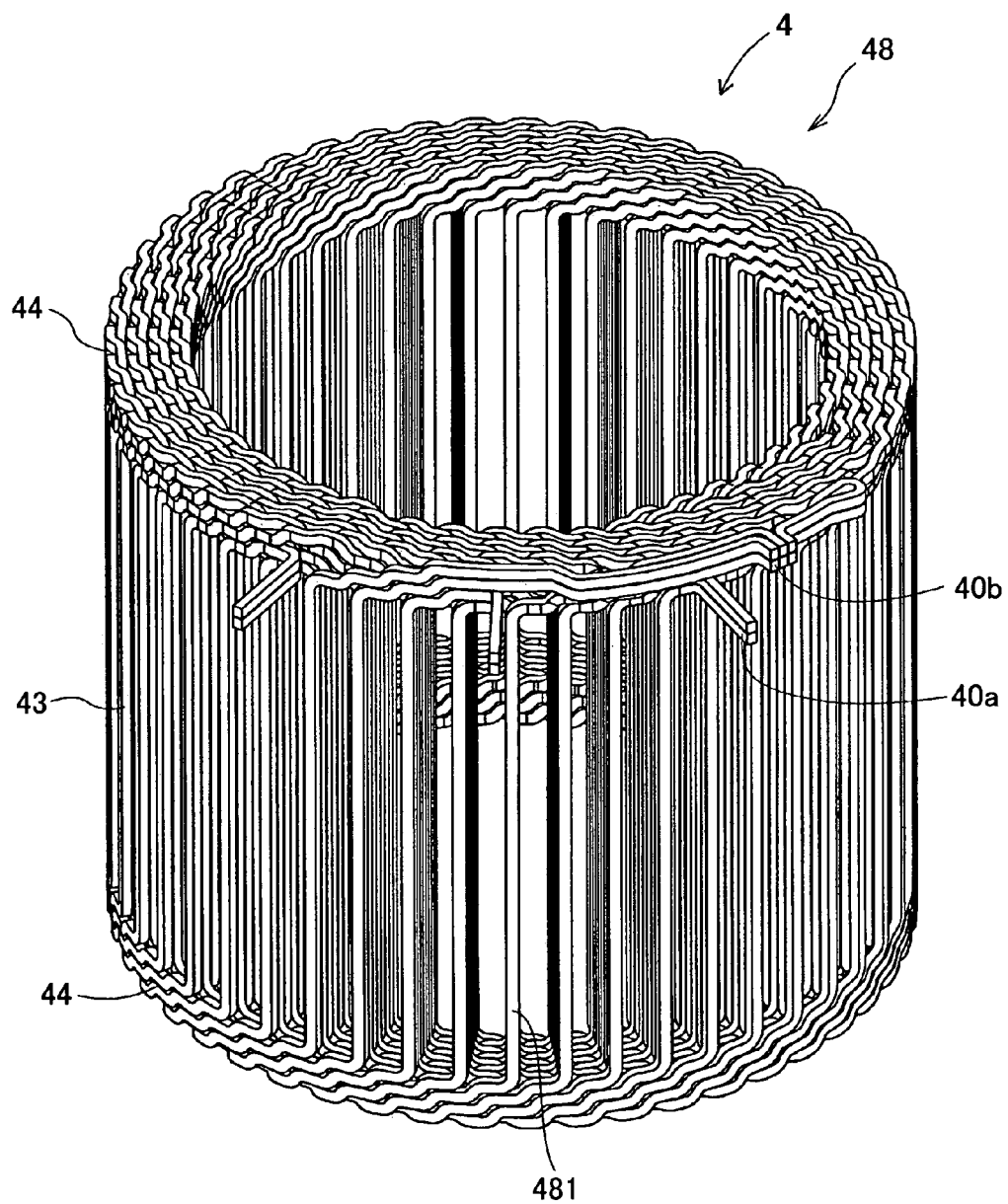
FIG. 7 is a perspective view illustrating a wound body serving as the stator coil according to the first embodiment.

As shown in FIG. 7, the stator coil 4 is formed by winding up a plurality of the windings 40 into a predetermined shape. The windings 40 configuring the stator coil 4 are formed into a shape in which wave winding are provided in the circumferential direction CR inside the stator core 30. Both ends of each of the plurality of windings 40 are projected from an end face of the stator core 30, in the axial direction AX.

Each of the windings 40 configuring the stator coil 4 includes linear slot-accommodation portions 43 (liner coil portions being accommodated in the slots) each of which is accommodated in each slot 31 of the stator core 30, and turn portions 44 each connecting adjacent slot-accommodation portions 43. The slot-accommodation portions 43 are accommodated in every predetermined ordinal slot 31 (in the present embodiment, 3 phases×2 slots=6 slots). The turn portions are formed, being axially projected from each end face of the stator core 30.

Figure 9:
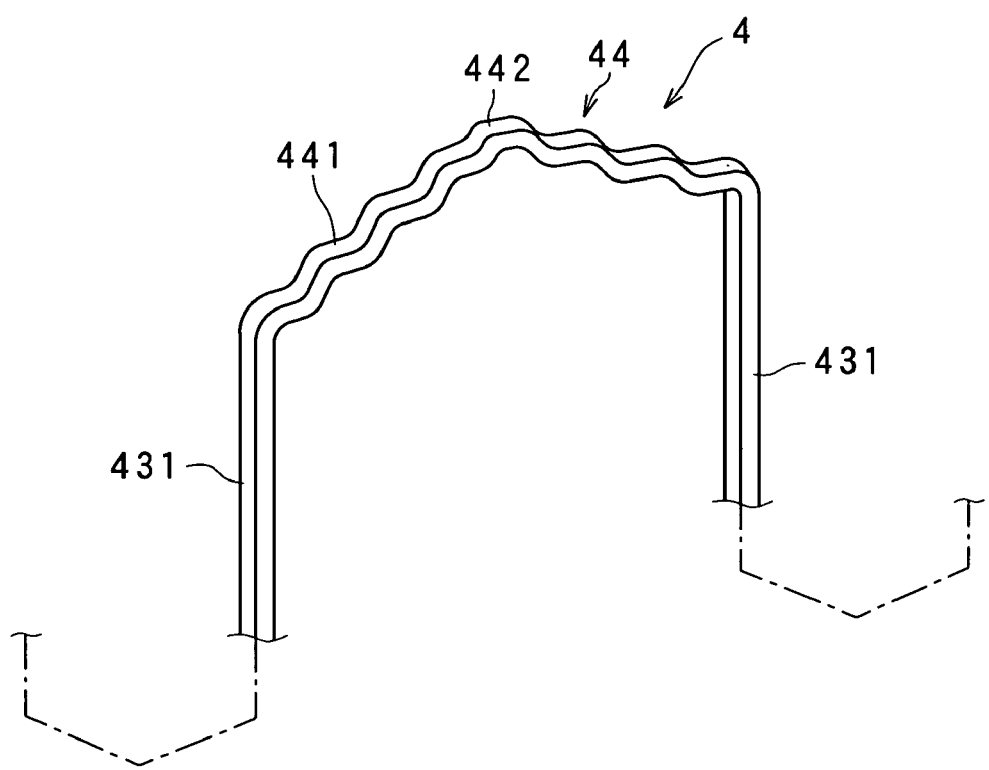
FIG. 9 is a perspective view illustrating a shape of a turn portion of a winding configuring the stator coil according to the first embodiment.

As shown in FIG. 9, each turn portion 44 has staircase portions 441. The staircase portions 441 of the turn portion 44 are each bent into a staircase shape toward the respective linear portions 431 connected by the turn portion 44 concerned. Specifically, each turn portion 44 projecting outside from the slot 31 of the stator core 30 is formed into a staircase shape from an end face in the axial direction AX of the stator core 30. Since the turn portions 44 are each formed into a staircase shape, mutual interference can be prevented from occurring between the turn portions 44 of the windings 40 projecting from the slots 31 adjacently located in the circumferential direction CR. Thus, the height of the coil end projecting from each end face of the stator core 30 can be prevented from being increased.

Each staircase portion 441 of the turn portion 44 is formed into a staircase shape of four steps. The height of one step of the staircase portion 441 substantially corresponds to the width (height) of the winding 40. Thus, when the turn portions 44 are put one on the other in the axial direction AX, no gap is produced between the turn portions 44. Accordingly, the turn portions 44 can be tightly wound up.

Each of the staircase-shaped turn portions 44 has a crank portion 442 at its highest portion (substantially the center portion corresponding to the top portion of the staircase shape of each turn portion 44). The crank portion 442 is bent into a crank shape without a twist. In particular, the crank portion 442 is formed substantially the center portion of the turn portion 44, with the staircase portions 441 being formed on both sides, sandwiching the crank portion 442. The crank portion 442 is formed so that the crank shape is provided in the circumferential direction CR of the stator core 30. An offset caused by the crank shape of the crank portion 442 (the offset in the radial direction RA of the stator core 3) substantially corresponds to the width of the winding 40. Thus, mutual interference can be prevented from occurring between the turn portions 44 of the windings 40, which are adjacently located in the radial direction RA, whereby the turn portions 44 can be tightly wound up. As a result, the size of the coil end projecting from each end face of the stator core can be prevented from being increased in the radial direction RA. Thus, the coil end can be prevented from jutting out of the stator core 30 in the radial direction RA.

One phase of the stator coil 4 is formed of a first winding 40a and a second winding 40b whose ends are joined by welding. In particular, one phase of the stator coil 4 is formed of one pair of windings in which two shaped wire members formed from two electrically conductive wires are mutually joined. The slot-accommodation portions 43 of the first winding 40a and the slot-accommodation portions 43 of the second winding 40b are accommodated in the same slots 31. In this regard, the slot-accommodation portions 43 of the first winding 40a are ensured to be positioned, being alternated by the slot-accommodation portions 43 of the second winding 40b in the depthwise direction of the individual slots 31. A joint 45 between the first and second windings 40a, 40b is formed in the slot-accommodation portion 43 that serves as a return portion 46. The winding direction of the first and second windings 40a, 40b is reversed in the return portion 46.

Figure 8:
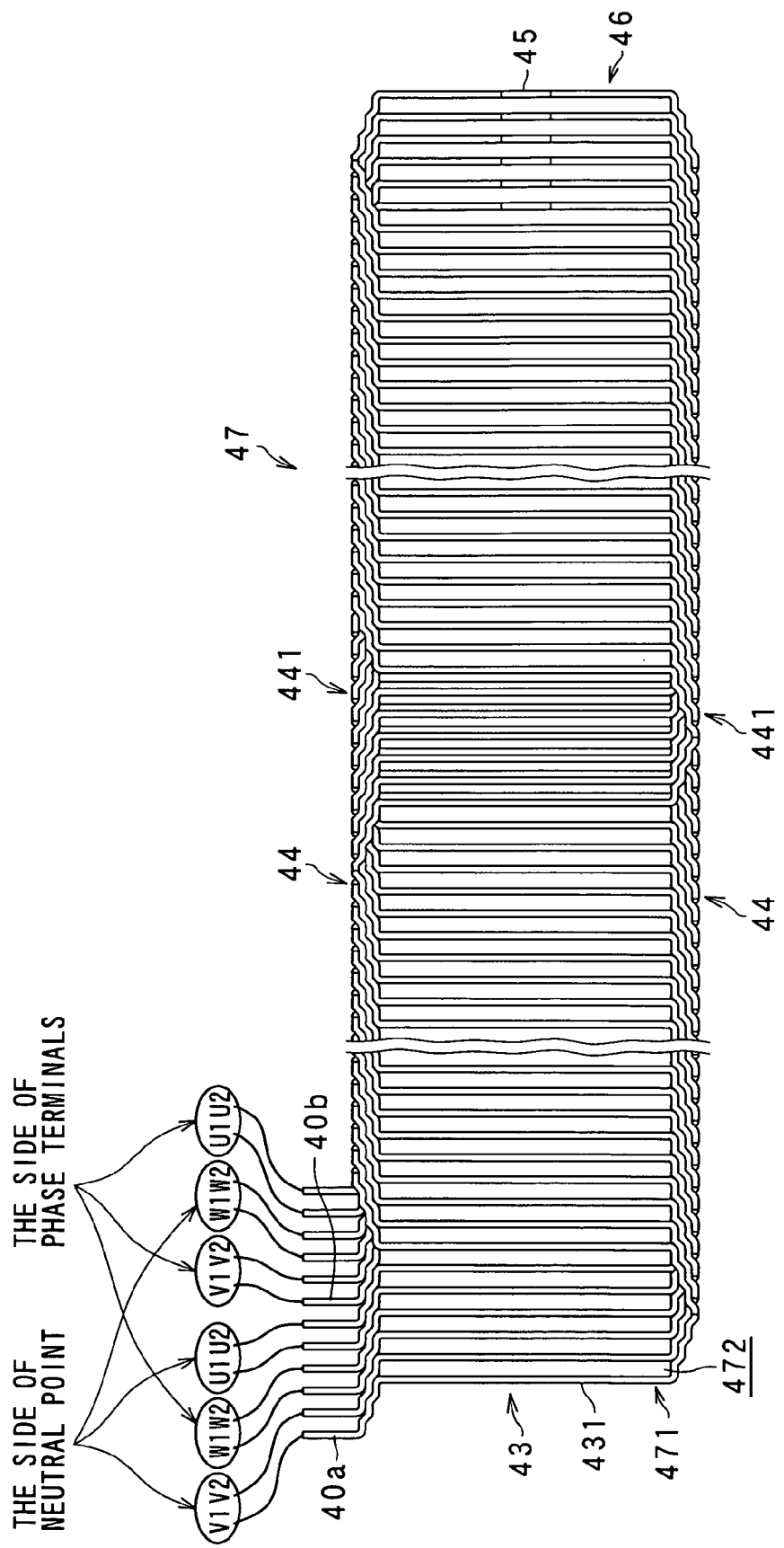
FIG. 8 is a development view illustrating the stator coil, or a plan view illustrating an integrated body, according to the first embodiment.

FIG. 8 is a development view illustrating the stator coil 4, or a plan view illustrating an integrated body 47 before being wound up. The stator coil 4 has six pairs of the first and second windings 40a, 40b that have different winding directions. A coil of 3-phase (U, V, W)×2-slot (double-slot coil) is provided using these six pairs of windings. In each pair, the end of the first winding 40a, which is opposite to the end on the side of the neutral point (or the side of the phase terminal), is connected to the end of the second winding 40b, which is opposite to the end on the side of the phase terminal (or the side of the neutral point), via the slot-accommodation portion 43 that is the return portion 46. The same connecting method is used for the individual phases of the windings 40.

Hereinafter is described the method for manufacturing a stator coil according to the first embodiment. Specifically, the stator coil 4 is manufactured as follows.

In the following description, the term "radial direction of the member" refers to the radial direction of a core member or a wound body. Also, the term "circumferential direction of the member" refers to the circumferential direction of the core member of the wound body.

<Shaping Step>

First, twelve shaped wire members are produced from twelve electrically conductive wires. Each of the shaped wire members here includes a plurality of linear portions 431 extending parallel to each other and juxtaposed in the longitudinal direction of the shaped wire member, and a plurality of turn portions 44 for connecting the adjacent linear portions 431 with each other alternately on one end side and on the other end side. Each turn portion 44 is formed with the staircase portions 441 and the crank portion 442.

<Integrating Step>

The twelve shaped wire members are integrated with each other to form the integrated body 47. In the integrated body 47, six pairs of windings are juxtaposed in the longitudinal direction of the integrated body 47, with the turn portions 44 being superposed with each other.

Each of the pairs consists of a first wire portion serving as the first winding 40a and a second wire portion serving as the second winding 40b. The first wire portion is formed of a single shaped wire member, and the second wire portion is formed of a single shaped wire member.

The ends of the first and second wire portions in each pair of windings are joined by welding to provide the joint 45. It should be appreciated that the twelve shaped wire members may first be integrated, followed by joining the ends of the first and second wire portions of each pair, or the ends of the first and second wire portions may first be joined, followed by integration of the six pairs.

In each pair of windings in the integrated body 47, the plurality of linear portions 431 of the first wire portion and the plurality of linear portions 431 of the second wire portion are superposed with each other to provide a plurality of linear superposition portions 471 in the longitudinal direction of the integrated body 47.

Also, in the integrated body 47, the superposition portions 471 of the pairs of windings are sequentially juxtaposed in the longitudinal direction of the integrated body 47. Specifically, the longitudinal juxtaposition includes repetitions of a sequence of the linear superposition portion 471 of the first pair, the linear superposition portion 471 of the second pair, the linear superposition portion 471 of the third pair, the linear superposition portion 471 of the fourth pair, the linear superposition portion 471 of the fifth pair, and the linear superposition portion 471 of the sixth pair.

On one end side of the shorter dimension of the integrated body 47, the turn portions 44 of the individual pairs are mutually superposed for juxtaposition in the longitudinal direction of the integrated body 47. Similarly, on the other end side of the shorter dimension of the integrated body 47, the turn portions 44 of the individual pairs are mutually superposed for juxtaposition in the longitudinal direction of the integrated body 47.

<Winding-Up Step>

The integrated body 47 is wound up with a predetermined number of turns (e.g., three or four turns) so that the return portions 46 will be positioned on the side of the axis, to form a wound body 48. The wound body 48 is provided with a plurality of linear stack portions 481 in the circumferential direction of the member, in each of which the plurality of linear superposition portions 471 of one pair of windings are stacked in the radial direction of the member, by the number corresponding to the number of turns. In each linear stack portion 481, the linear portions 431 twice of the number of turns are superposed with each other in the radial direction of the member (in the radial direction) for alignment. In this case, the individual linear stack portions 481 are located along the circumferential direction of the wound body 48, with small intervals therebetween.

For the wound body 48 obtained in this way, the teeth 320 of each of the segment cores 32 are inserted, from outside with respect to the radial direction of the member, into the respective gaps between adjacent linear stack portions 481 to mutually couple the adjacent segment cores 32 to thereby provide the stator 3.

Referring now to FIGS. 10 to 13, hereinafter is described a winding-up step performed in the method for manufacturing a stator coil according to the first embodiment.

The winding-up step performed in the method for manufacturing a stator coil according to the first embodiment is a pitch-by-pitch winding-up step. At the pitch-by-pitch winding-up step, the integrated body 47 is fed on one pitch (an interval between adjacent linear superposition portions 471 in the integrated body 47) basis, for example, to a core member 6, while the integrated body 47 is wound up about the columnar core member (cored bar) 6.

Figure 10:
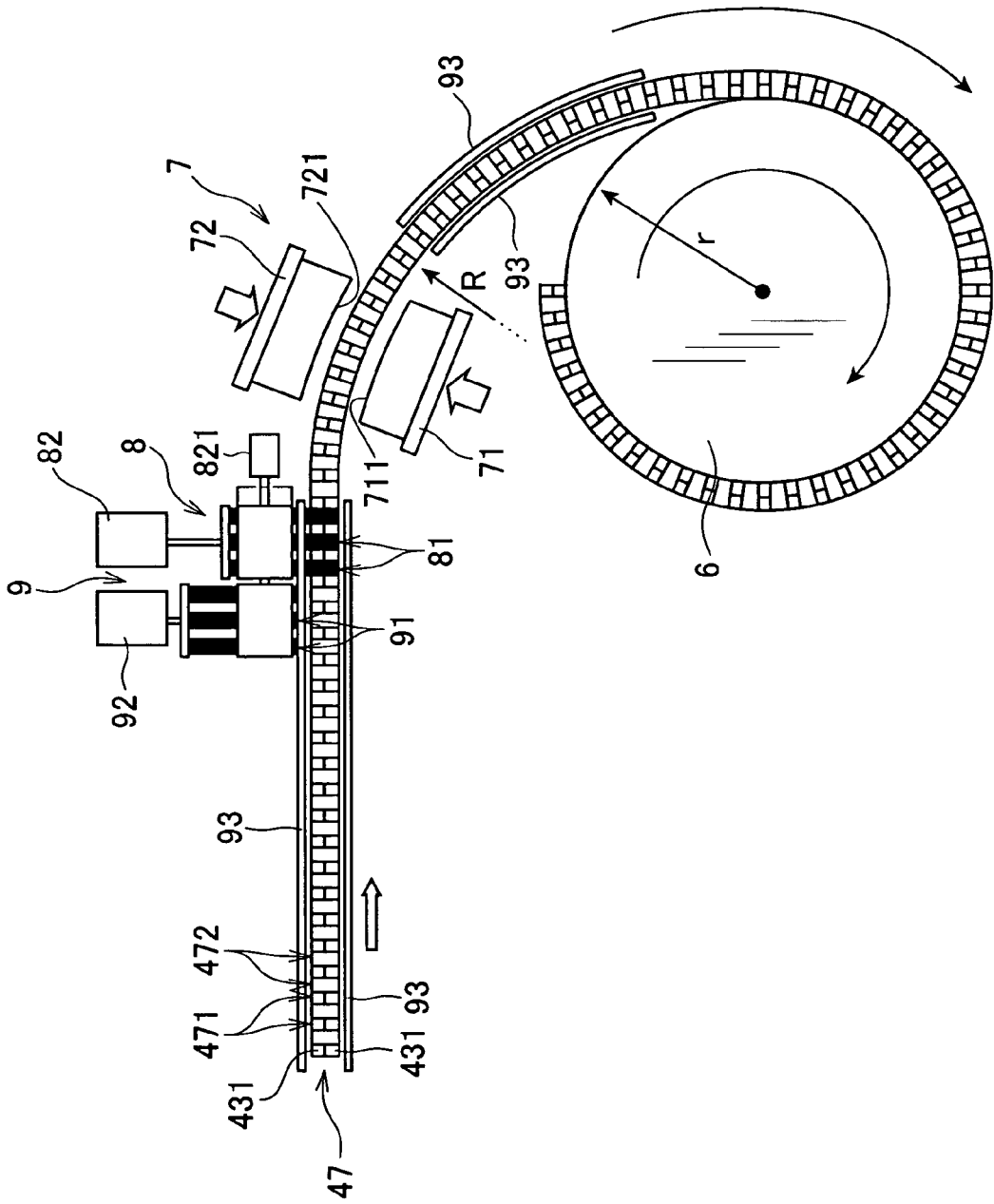
FIG. 10 is a schematic view illustrating a method for manufacturing the stator coil according to the first embodiment.

The winding-up step of the present embodiment includes a first-half conveyance of feeding the integrated body 47 to the core member 6. In the first-half conveyance, the superposition of the linear portions 431 in the linear superposition portions 471 of the integrated body 47 is aligned in advance, and the size of gaps 472 between the adjacent linear superposition portions 471 is made uniform in advance. In the present embodiment, the "justification in advance" is referred to as a "preliminary alignment". In a latter-half conveyance of feeding the integrated body 47 to the core member 6, each of the turn portions 44 of the integrated body 47 is subjected to a curve forming process. In the curve forming process, the turn portions 44 on both ends of the shorter dimension of the integrated body 47 are each plastically deformed, as shown in FIG. 10, into a curved round shape with a curvature radius R which is substantially the same as a winding radius r for the core member 6.

The core member 6 is rotated (clockwise rotation in FIG. 10) and the integrated body 47 is horizontally moved (horizontal movement from the left to the right in FIG. 10) for conveyance to the core member 6. Although not shown, these operations may be performed using a known drive unit and a control unit for controlling the drive unit.

Preliminary alignment of the integrated body 47 is performed by means of a preliminary alignment unit 8 and a position retention unit 9.

The preliminary alignment unit 8 includes a plurality of (three in the present embodiment) preliminary alignment members 81, a preliminary alignment member drive 82, and a horizontal drive 821. The preliminary alignment member drive 82 simultaneously inserts/withdraws all the preliminary alignment members 81. The preliminary alignment member drive may be provided to each of the preliminary alignment members 81, so that the preliminary alignment members 81 can be independently inserted/withdrawn. The direction of the insertion/withdrawal of the preliminary alignment members 81 coincides with the direction of the superposition of the linear portions 431 in each linear superposition portion 471 of the integrated body 47 which is conveyed to the core member 6. Thus, the preliminary alignment members 81, when moved forward, are inserted into the respective gaps 472, and when moved rearward, are withdrawn from the respective gaps 472.

The preliminary alignment members 81 and the preliminary alignment member drive 82 are adapted to enable advance/retreat movement by the horizontal drive 821, parallel to the direction in which the integrated body 47 is conveyed. In this case, the amount of advance (or amount of retreat) is equal to the interval between adjacently located linear superposition portions 471, i.e. is equal to the length of one pitch. The amount of advance (or amount of retreat) may be set so as to be equal to an amount of one feeding in the pitch-by-pitch winding-up step. Specifically, in the pitch-by-pitch winding-up step on N pitch basis (N is a natural number), the amount of advance may be equal to N times (N is a natural number) of the interval between the adjacently located linear superposition portions 471 in the integrated body 47. The advance movement (movement in the direction to which the integrated body 47 is conveyed) of the preliminary alignment members 81 and the preliminary alignment member drive 82 is conducted at the speed of and in synchronization with the conveyance of the integrated body 47.

The position retention unit 9 includes a plurality of (three in the present embodiment) position retention members 91 and a position retention member drive 92. The position retention member drive 92 is adapted to simultaneously insert/withdraw all the position retention members 91. The position retention member drive may be provided to each of the position retention members 91, so that the position retention members 91 can be independently inserted/withdrawn. The direction of the insertion/withdrawal of the position retention members 91 coincides with the direction of the superposition of the linear portions 431 in each linear superposition portion 471 of the integrated body 47 which is conveyed to the core member 6. Thus, the position retention members 91, when moved forward, are inserted into the respective gaps 472, and when moved rearward, are withdrawn from the respective gaps 472.

A pair of upper and lower adjustment plates 93 equalize the thickness of the turn portions 44 of the integrated body 47 (the thickness of the linear portions 431 in the direction of their superposition) conveyed to the core member 6. The pair of upper and lower adjustment plates 93 are disposed both downstream and upstream of a curve forming unit, which will be described later, in terms of the direction of conveyance.

Each of the preliminary alignment members 81 has substantially the same width (the width in the direction to which the integrated body 47 is conveyed) as that of the gap 472 between the adjacently located linear superposition portions 471 of the integrated body 47. Accordingly, when the preliminary alignment members 81 are inserted into the respective gaps 472, each linear superposition portion 471 is sandwiched between the preliminary alignment members 81. As a result, superposition of the linear portions 431 in each linear superposition portion 471 is justified to thereby align the linear portions 431 in the direction of their superposition.

Thus, at least two preliminary alignment members 81 are required in order to align the linear portions 431 in their superposition direction in each linear superposition portion 471. Three or more preliminary alignment members 81 may enable equalization of the interval between two linear superposition portions 471 concerned which are located between the preliminary alignment members 81 on both outer sides. Accordingly, it is preferable that three or more the preliminary alignment members 81 are provided. However, from the viewpoint of enhancing the accuracy in the alignment of the linear portions 431 in each linear superposition portion 471 or the accuracy in the pitch between the linear superposition portions 471, the number of the preliminary alignment members 81 may preferably be n/2 or more, where n is the number of the linear superposition portions 471 in the integrated body 47.

Each position retention member 91 has a width slightly smaller than that of each preliminary alignment member 81. In other words, each position retention member 91 has a width slightly smaller than that of each gap 472 in the integrated body 47. Therefore, it is easy to insert the position retention members 91 into the integrated body 47 that has been conveyed, which insertion occurs prior to the insertion of the preliminary alignment members 81.

Figure 13:
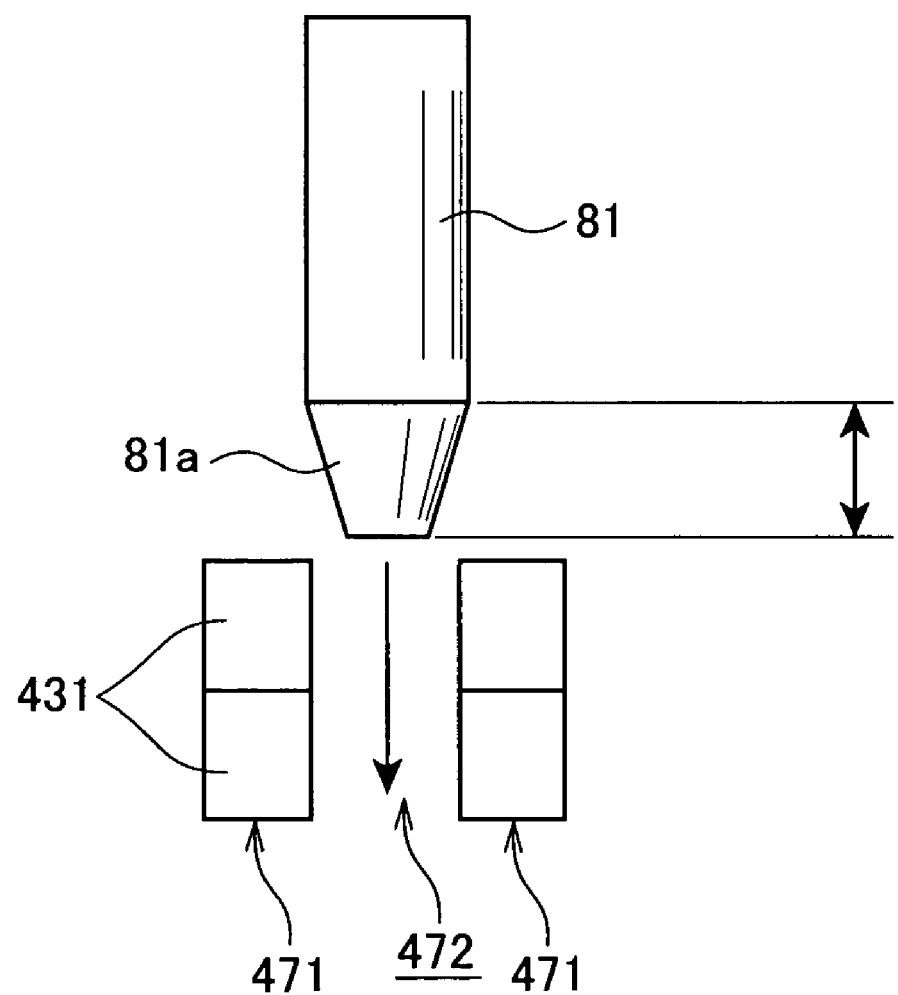
FIG. 13 is a side view illustrating the shape of an end of the preliminary alignment member or the position retention member to show a method for manufacturing the stator coil according to the first embodiment.

As shown in FIG. 13, an end portion 81a of each of the preliminary alignment members 81 and the position retention members 91 has a shape in which the width becomes smaller toward the tip end, from the viewpoint that the preliminary alignment members 81 and the position retention members 91 are more easily inserted into the gaps 472.

Each of the preliminary alignment members 81 and the position retention members 91 are rectangular parallelepiped with a rectangular cross section to match the shape of each gap 472 in the integrated body 47. However, a single preliminary alignment member 81 (or a single position retention member 91) having the rectangular parallelepiped shape may be replaced by a plurality of preliminary alignment members (or position retention members) each having a columnar shape or the like.

The curve forming process for the integrated body 47 is performed using a curve forming unit 7 including several different convex tools 71 and several different concave tools 72. The several different convex tools 71 and the concave tools 72 are prepared by the number corresponding to the number of winding turns of the integrated body 47 for the core member 6. Each convex tool 71 has a convex curve-forming face 711 of different curvature radius R. Similarly, each concave tool 72 has a concave curve-forming face 721 of different curvature radius R.

In performing curve forming of a portion of the integrated body 47, which is wound up about the core member 6 with the first turn, first convex tool 71 and concave tool 72 are used. The first convex and concave tools 71, 72 have first convex curve forming faces 711 and concave curve-forming faces 721, respectively, with the curvature radius R which is substantially the same as the winding radius r of the first turn. In performing curve forming of a portion of the integrated body 47, which is wound up about the core member 6 with the second turn, second convex tool 71 and concave tool 72 are used. The second convex and concave tools 71, 72 have second convex curve forming faces 711 and concave curve-forming faces 721, respectively, with the curvature radius R which is substantially the same as the winding radius r of the second turn. In performing curve forming of a portion of the integrated body 47, which is wound up about the core member 6 with the third turn, third convex tool 71 and concave tool 72 are used. The third convex and concave tools 71, 72 have third convex curve forming face 711 and concave curve-forming face 721, respectively, having the curvature radius R which is substantially the same as the winding radius r of the third turn. In performing curve forming of a portion of the integrated body 47, which is wound up about the core member 6 with the fourth turn, fourth convex tool 71 and concave tool 72 are used. The fourth convex and concave tools 71, 72 have fourth convex curve forming face 711 and concave curve-forming face 721, respectively, having the curvature radius R which is substantially the same as the winding radius r of the fourth turn.

The first to fourth convex and concave tools 71, 72 are disposed so as to be movable in the direction, for example, perpendicular (the direction of the shorter dimension of the integrated body 47, i.e. the front-to-rear direction as viewed from the drawing sheet of FIG. 10) to the direction in which the integrated body 47 is conveyed. The convex and concave tools 71, 72 are shifted to the positions corresponding to the turn portions 44 on one end side of the shorter dimension and corresponding to the turn portions 44 on the other end side of the shorter dimension of the integrated body 47, using a shifter, not shown, to perform the curve forming for both of the turn portions 44 using a drive, not shown.

The control unit controls the preliminary alignment member drive 82, the position retention member drive 92, the horizontal drive 821, a rotation drive for the core member 6, a conveyance drive for the integrated body 47, as well as the shifter and the drive for the curve forming unit 7. With the control of the control unit, preliminary alignment and curve forming of the integrated body 47 can be performed, while the integrated body 47 is wound up about the core member 6 as will be described below.

<Step of Inserting Position Retention Members>

The integrated body 47 is conveyed until a winding end of the integrated body 47 is positioned just before the curve forming unit 7. After stopping the conveyance of the integrated body 47, the position retention members 91 are inserted into the gaps 472 of the integrated body 47 (the state shown by (B) of FIG. 12). Thus, the integrated body 47 is located in a predetermined position.

<Step of Inserting Preliminary Alignment Members>

Figure 12:
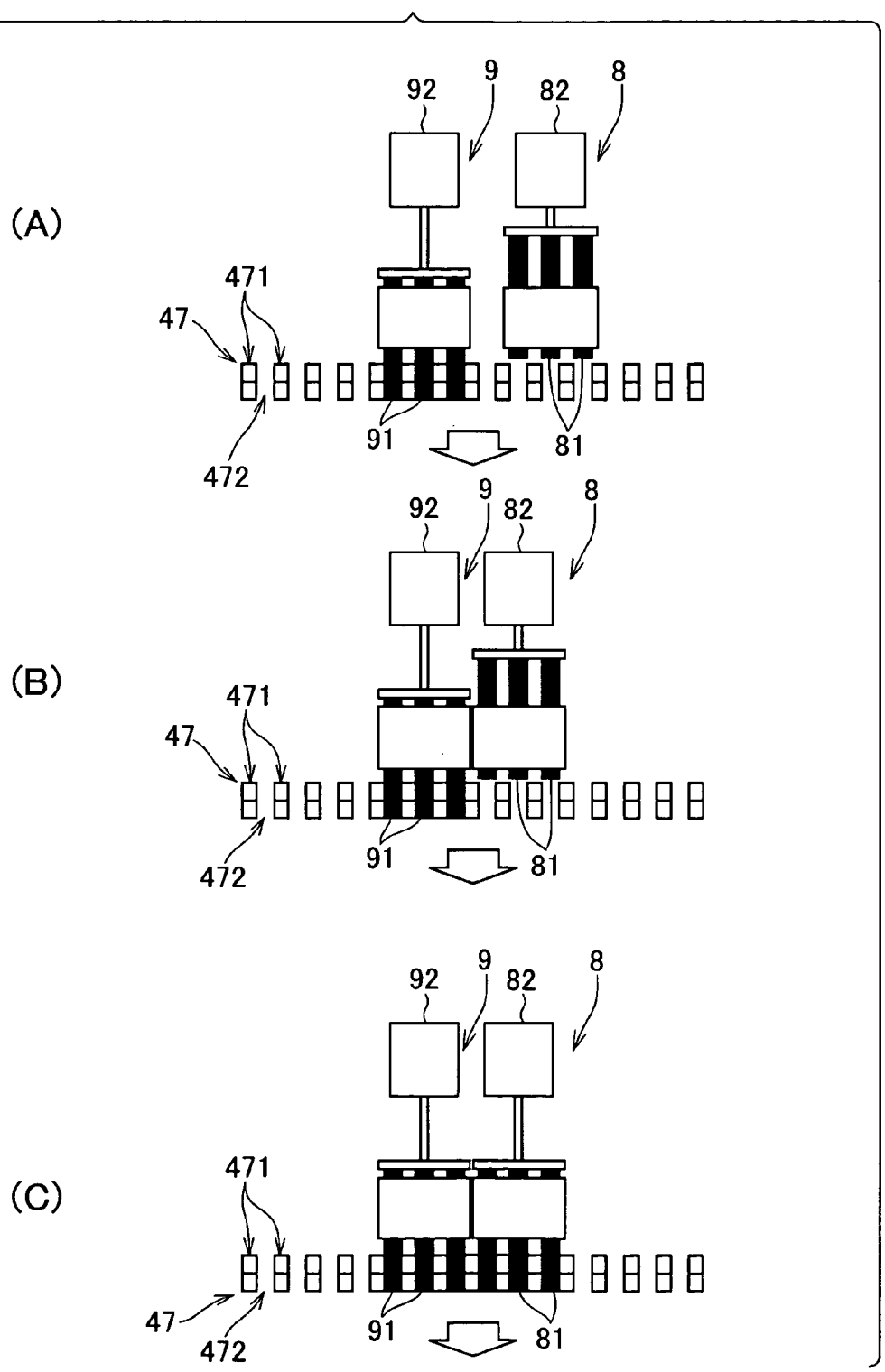
FIG. 12 are schematic views illustrating the operation of the preliminary alignment members and the position retention members to show a method for manufacturing the stator coil according to the first embodiment.

The preliminary alignment members 81 are inserted into the gaps 472 of the integrated body 47 which is held at the predetermined position by the position retention members 91 (see (C) of FIG. 12). Thus, the linear portions 431 in each linear superposition portion 471 can be aligned in the radial direction of the member, on the side of the winding end of the integrated body 47. At the same time, the intervals between the linear superposition portions 471 can be uniformed.

<Step of Removing Position Retention Members>

Figure 11:
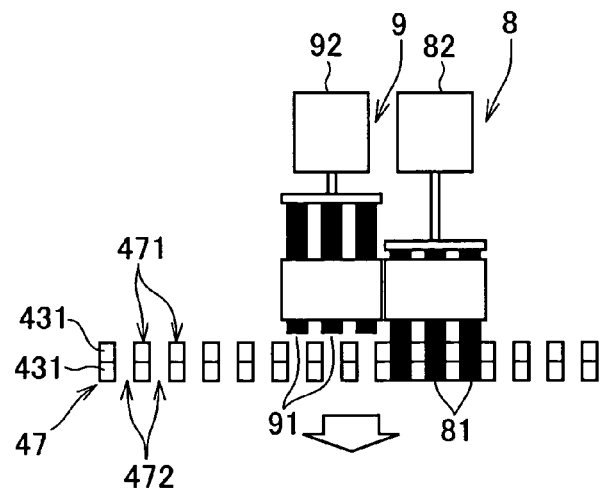
FIG. 11 are schematic views illustrating the operation of preliminary alignment members and position retention members to show a method for manufacturing the stator coil according to the first embodiment.
Figure 11:
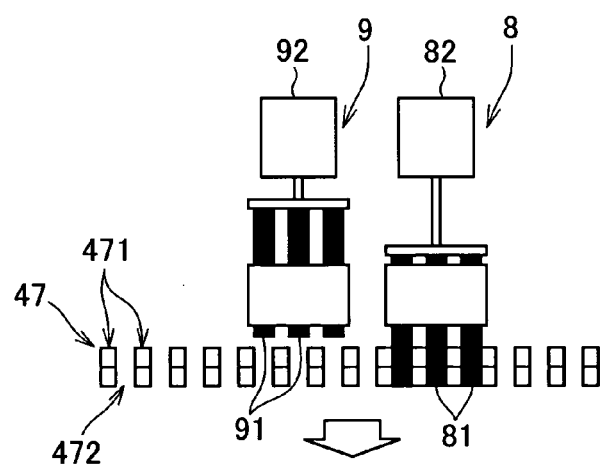
Figure 11:
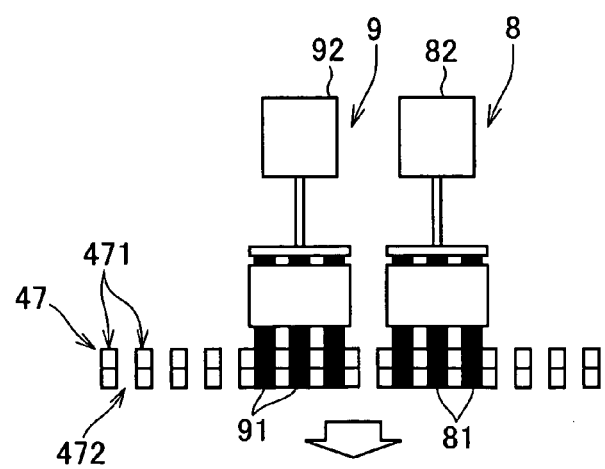

Then, the position retention members 91 are withdrawn from the gaps 472 of the integrated body 47 (see (A) of FIG. 11).

<Step of Advance Movement>

Then, the integrated body 47 is advanced toward the core member 6 by one pitch in the state where the preliminary alignment members 81 are being inserted in the gaps 472 (see (B) of FIG. 11). Thus, the winding end of the integrated body 47 comes into the curve forming unit 7. In other words, the winding end of the integrated body 47 comes into a gap between the convex and concave curve-forming faces 711, 721 of the first convex and concave tools 71, 72, respectively.

<Curve Forming Step>

The one-pitch advance of the integrated body 47 at the step of advance movement is followed by application of pressure. Specifically, the turn portions 44 of the integrated body 47 are sandwiched between the convex curve-forming face 711 of the first convex tool 71 and the concave curve-forming face 721 of the first concave tool 72 with the operation of the drive of the curve forming unit 7, for application of pressure. As a result, the turn portions 44 are subjected to curve forming by being plastically deformed, so as to have a curved round shape with the curvature radius R which is substantially the same as the winding radius r of the first turn.

By the time of curve forming, the staircase portions 441 of the turn portions 44 will have been well arrayed because the linear portions 431 of the integrated body 47 have been aligned with a uniform pitch by the preliminary alignment members 81. Accordingly, the turn portions 44 can be suppressed from suffering from damage that could be caused by the interference between the turn portions 44 during the curve forming. At the same time, more reliable curve forming can be conducted for the turn portions 44.

<Step of Inserting Position Retention Members>

Then, the position retention members 91 are inserted into other gaps (e.g., the gaps distanced in the direction opposite to the direction of conveyance, by one pitch from the gaps 472 inserted with the preliminary alignment members 81) 472 of the integrated body 47 in the state where the preliminary alignment members 81 are inserted into the gaps 472 (see (C) of FIG. 11).

<Step of Removing Preliminary Alignment Members>

After that, the preliminary alignment members 81 are withdrawn from the integrated body 47 in the state where the position retention members 91 are inserted into the gaps 472 (see (A) of FIG. 12).

<Step of Retreat Movement>

Then, the preliminary alignment members 81 are retreated by one pitch in the direction opposite to the direction of conveyance (see (B) of FIG. 12).

<Repetition from Step of Inserting Preliminary Alignment Members to Step of Retreat Movement>

Then, the step of inserting preliminary alignment members is performed, in which the preliminary alignment members 81 are inserted into other gaps (e.g., the gaps subsequent to the gaps 472 inserted with the position retention members 91) 472 of the integrated body 47 in the state where the position retention member 91 are inserted into the gaps 472. Thus, the above steps are repeatedly performed, i.e. the step of inserting preliminary alignment members, the step of removing position retention members, the step of advance movement, the step of inserting position retention members, the step of removing preliminary alignment members, and the step of retreat movement.

Thus, the integrated body 47 is easily and reliably wound up about the core member 6 which is rotated by the rotation drive, after the turn portions 44 of the integrated body have been subjected to curve forming, so as to have a curved round shape with the curvature radius R which is substantially the same as the winding radius r of the first turn.

The integrated body 47 corresponding to the first turn is wound up in this way about the core member 6. After completing the first turn, the first convex and concave tools 71, 72 are replaced by the second convex and concave tools 71, 72 for location at the positions corresponding to the turn portions 44 of the integrated body 47. Then winding up of the second turn is carried out by repeating the same steps of the first turn. Winding up of the third and the subsequent turns is also carried out in the same way.

As described above, in the first embodiment, preliminary alignment is performed for the integrated body 47 before curve forming. Owing to this, the linear portions 431 in each linear superposition portion 471 can be aligned in advance in the direction of superposition, using the preliminary alignment members 81. At the same time, the intervals between adjacently located linear superposition portions 471 can be uniformed in advance. Thus, the staircase portions 441 can be suppressed from being disarrayed in the turn portions 44 each connecting the linear portions 431. Therefore, the turn portions 44, when subjected to curve forming, can be prevented from suffering from the damages that could be caused by the interference between the turn portions 44. Further, being independent of the winding up of the integrated body 47 about the core member 6, the turn portions 44 can be plastically deformed for curve forming, using simply structured curve forming unit 7 including the convex and concave tools 71, 72. Thus, the turn portions 44 having the staircases portions 441 can be reliably and easily subjected to curve forming so as to have a curved round shape with the predetermined curvature radius R. Also, the integrated body 47 can be easily and reliably wound about the core 6, because the turn portions 44 have been curve-formed in advance so as to have the curvature radius R substantially the same as the winding radius r.

Resultantly, it is possible, in the obtained wound body 48, to suppress the winding radius from becoming larger than a desired dimension, to suppress the staircase portions 441 in the turn portions 44 from being disarrayed, to suppress the adjacently located linear stack portions 481 from having uneven intervals, or to suppress the superposition of the plurality of linear portions 431 in each linear stack portion 481 from being deviated. Thus, the accuracy can be enhanced in the alignment and the pitch in the linear stack portions 481 of the wound body 48, and at the same time, the accuracy can also be enhanced in the array of the staircase portions 441 of the turn portions 44.

In the first embodiment, the curvature radius R is changed for the convex and concave curve-forming faces 711, 721 of the convex and concave tools 71, 72, respectively, according to the winding radius that changes with every turn. Thus, the integrated body 47 can be reliably wound up about the core member 6. Accordingly, it is possible, in the obtained wound body 48, to further enhance the accuracy in the alignment and the pitch in the linear stack portions 481 of the wound body 48.

Thus, the linear stack portions 481 of the wound body 48, i.e. the stator coil 4, obtained in the first embodiment can be reliably accommodated in the respective slots 31 of the stator core 30. Accordingly, the slot occupancy in the stator coil 3 can be improved, and the output of the electric rotary machine using the stator 3 can be enhanced.

Also, the dimension of the stator coil 3 can be suppressed from becoming large in the axial direction AX, for example, because the staircase portions 441 of the turn portions 44 can be suppressed from being disarrayed in the wound body 48.

Further, the linear stack portions 481 of the wound body 48 can be easily accommodated in the respective slots 31, whereby the productivity of the stator 3 can be enhanced.

In addition, whenever the integrated body 47 is in the state where the preliminary alignment members 81 are withdrawn from the gaps 472, the position retention members 91 have already been inserted into other gaps 472 to place the integrated body 47 in position. In other words, removal and insertion of the preliminary alignment members 81 are performed for the integrated body 47 that has been placed in position by the position retention members 91. Therefore, the preliminary alignment members 81 can be easily inserted into the subsequent gaps 472.

(Second Embodiment)

Figure 14:
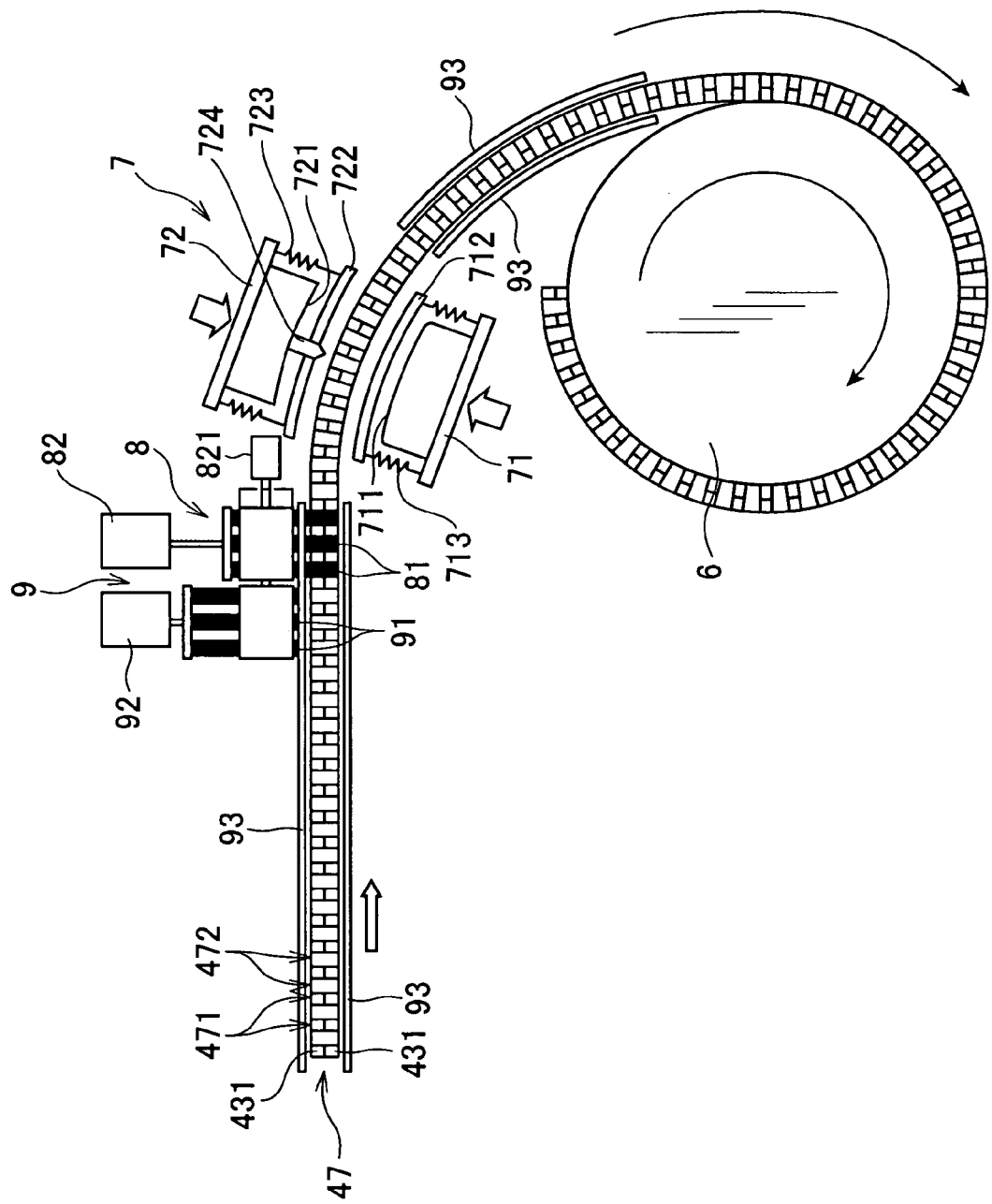
FIG. 14 is a schematic view illustrating a method for manufacturing a stator coil according to a second embodiment of the present invention.

Referring to FIG. 14, hereinafter is described a method for manufacturing a stator coil for a rotary electric machine, according to a second embodiment. Is should be appreciated that, in the second and the subsequent embodiments, the identical or similar components to those in the first embodiment are given the same reference numerals for the sake of omitting or simplifying explanation.

The method for manufacturing a stator coil according to the second embodiment shown in FIG. 14 is different from the configuration of the first embodiment in that the configuration of the convex and concave tools 71, 72 as the curve forming unit 7 has been changed.

Specifically, the convex tool 71 has a convex pressing plate 712 made up such as of an elastically deformable steel leaf. The convex pressing plate 712 has a curved shape that substantially matches the convex curve-forming face 711 of the convex tool 71, to cover the convex curve-forming face 711. The convex pressing plate 712 is held by the convex tool 71 with the use of a spring 713.

The concave tool 72 has a concave pressing plate 722 made up, such as of an elastically deformable steel leaf. The concave pressing plate 722 has a curved shape that substantially matches the concave curve-forming face 721 of the convex tool 72, to cover the convex curve-forming face 721. The concave pressing plate 722 is held by the concave tool 72 with the use of a spring 723. The concave tool 72 has an alignment pin 724 which can be inserted into a gap 472 formed between the adjacently located linear superposition portions 471 of the integrated body 47. The alignment pin 724 is fixed to a side edge of the concave tool 72 so that it can be inserted into the gap 472 in the vicinity of an end portion of the integrated body 47 with respect to the direction of its shorter dimension. The alignment pin 724 may be provided at the convex tool 71 instead of, or as well as, the concave tool 72.

Thus, in the second embodiment, the convex pressing plate 712 is interposed between the convex curve-forming face 711 and the turn portions 44, while the concave pressing plate 712 is interposed between the curve-forming face 721 and the turn portions 44, when the turn portions 44 of the integrated body 47 are curve-formed by the convex and concave tools 71, 72.

With the interposition of the pressing plates, the turn portions 44 can be pressed by being sandwiched between the convex and concave curve-forming faces 711, 721. In this way, the convex and concave curve-forming faces 711, 721 can be prevented from coming into contact with the turn portions 44. Accordingly, the turn portions 44 do not have to suffer from the damage that could be caused by being in contact with the convex and concave curve-forming faces 711, 721.

Moreover, the convex and concave pressing plates 712, 722 are held by the springs 713, 723, respectively, for the convex and concave tools 71, 72. Accordingly, in curve-forming the turn portions 44 by the convex and concave tools 71, 72, the turn portions 44 can first be pressed by the spring force caused by the convex and concave pressing plates 712, 722. Thus, turn portions 44 can be effectively suppressed from being disarrayed.

Since the convex tool 72 is provided with the alignment pin 724, the turn portions 44 can be sandwiched between the convex and concave tools 71, 72, with the alignment pin 724 being inserted into the gap 472 of the integrated body 47. Thus, the integrated body 47 can be placed in position by the alignment pin 724 in the longitudinal direction of the integrated body 47 during the curve forming of the turn portions 44.

In this way, the accuracy can be enhanced in the alignment and the pitch in the linear stack portions 481 of the wound body 48, and at the same time, the accuracy can also be enhanced in the array of the staircase portions 441 of the turn portions 44.

Description on other portions of the configuration and other advantages is omitted because they are the same as those in the first embodiment.

(Third Embodiment)

Figure 15:
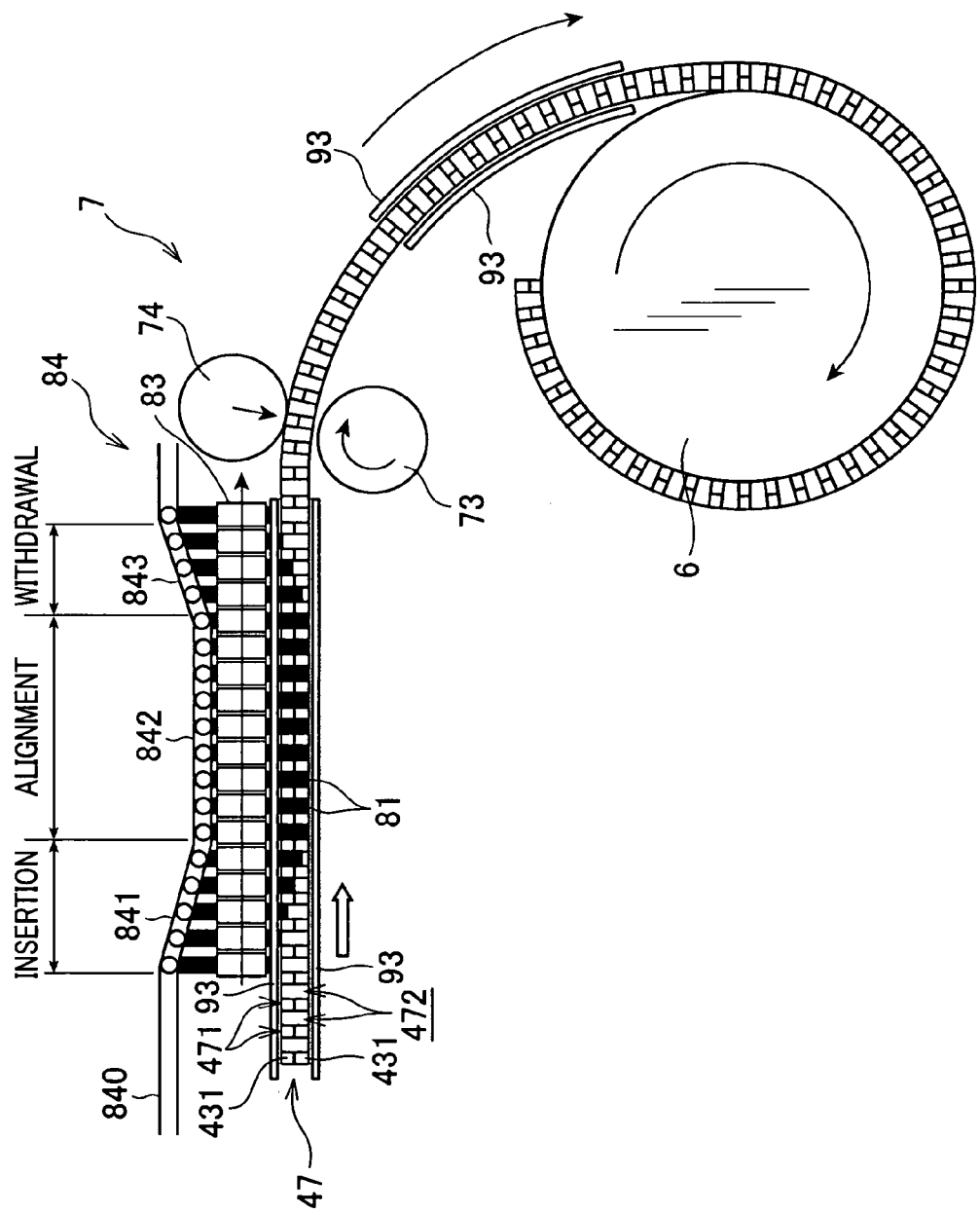
FIG. 15 is a schematic view illustrating a method for manufacturing a stator coil according to a third embodiment of the present invention.
Figure 16:
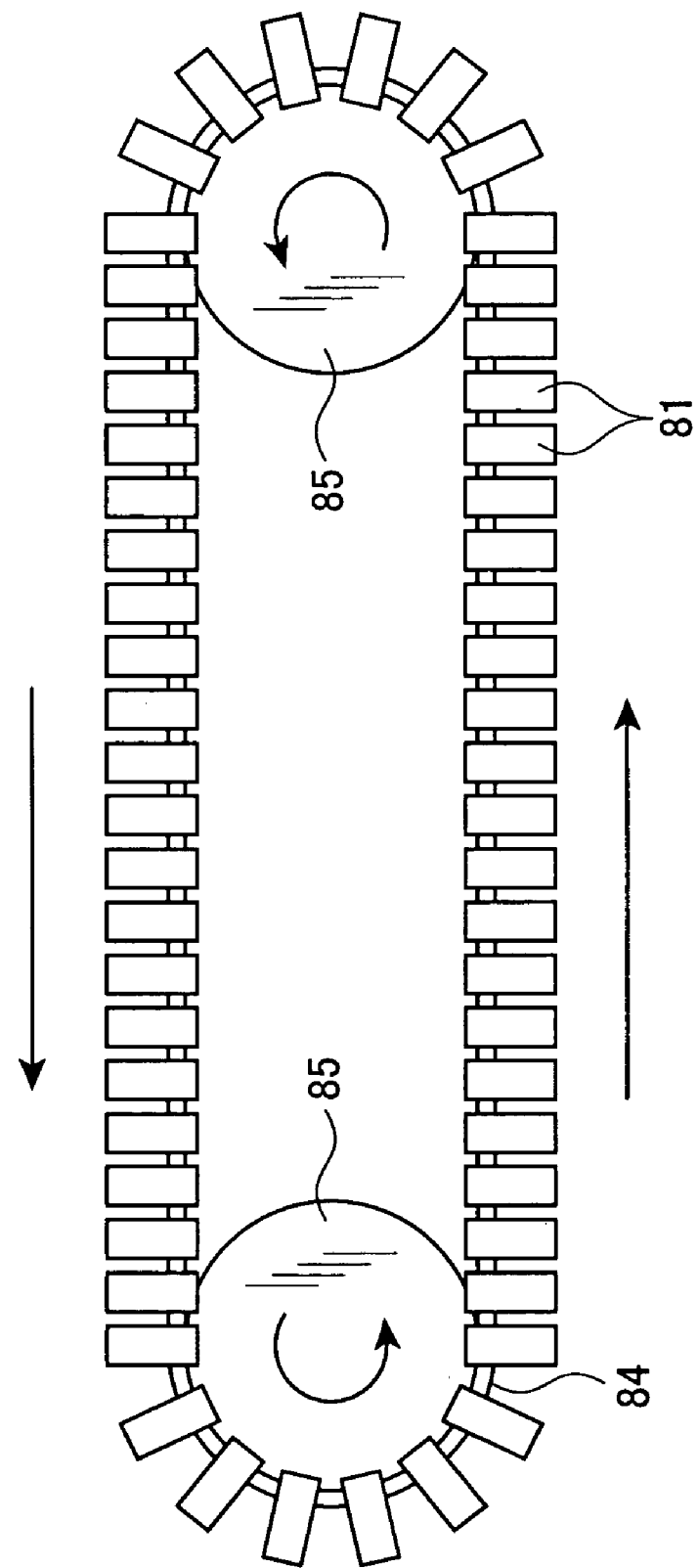
FIG. 16 is a schematic view illustrating a configuration for moving preliminary alignment members using feed rollers in a manner of belt conveyor to show a method for manufacturing the stator coil according to the third embodiment.

Referring to FIGS. 15 and 16, hereinafter is described a method for manufacturing a stator coil for a rotary electric machine, according to a third embodiment.

FIGS. 15 and 16 illustrate a winding-up step in the method for manufacturing a stator coil according to the third embodiment. This winding-up step is different from that in the above embodiments in that the winding-up step is continuously performed. At the continuous winding-up step, the integrated body 47 is continuously fed to the core member 6 for winding up.

The plurality of preliminary alignment members 81 are adapted to be movable in the direction in which the integrated body 47 is conveyed, by a pair of feed rollers 85 under the guide of a guide member 83, in conformity with the conveyance direction in a manner of belt conveyor. A preliminary alignment member movement regulating member 84 is provided to control the insertion/withdrawal of the plurality of preliminary alignment members 81, for the gaps 472 of the integrated body 47.

The pair of feed rollers 85 are controlled by the control unit together with the rotation drive of the core member 6, the conveyance drive of the integrated body 47, the drive of the curve forming unit 7, and the like.

Each of the preliminary alignment members 81 has the same configuration as the one described in the first embodiment.

The preliminary alignment member regulating member 84 is disposed at a position corresponding to substantially the center region of the integrated body 47 with respect to the shorter dimension thereof. The regulating member 84 includes a normal section 840, an insertion section 841, an alignment section 842 and a withdrawal section 843. The normal section 840 extends parallel to the direction of conveyance of the integrated body 47. The alignment section 842 extends parallel to the direction of conveyance of the integrated body 47 at a level lower than the normal section 840 by a predetermined amount. The insertion section 841 is slanted down toward the direction of conveyance of the integrated body 47 to connect between the normal section 840 and the alignment section 842. The withdrawal section 843 is slanted up toward the direction of conveyance of the integrated body 47 to connect between the alignment section 842 and the normal section 840.

At the insertion section 841, the preliminary alignment member regulating member 84 gradually lifts down the preliminary alignment members 81, toward the direction of conveyance of the integrated body 47, so that the preliminary alignment members 81 can be gradually inserted into the respective gaps 472 of the integrated body 47.

At the alignment section 842, the preliminary alignment member regulating member 84 horizontally moves the preliminary alignment members 81, which are in the state of being completely inserted into the respective gaps 472, in the conveyance direction. Thus, within the range of the alignment section 842, the linear portions 431 in each linear superposition portion 471 of the integrated body 47 can be aligned in the direction of the superposition, and at the same time, the intervals between the adjacently located superposition portions 471 can be uniformed.

At the withdrawal section 843, the preliminary alignment member 84 gradually lifts up the preliminary alignment members 81 toward the direction of conveyance of the integrated body 47 to withdraw the preliminary alignment members 81 from the respective gaps 472 of the integrated body 47.

Thus, preliminary alignment can be effected to the integrated body 47 while the integrated body 47 is continuously fed and wound up about the core member 6.

When the preliminary alignment members 81 have been withdrawn from the gaps 472 of the integrated body 47, the integrated body 47 is fed to the curve forming unit 7.

The curve forming unit 7 of the third embodiment is provided with a first metal roller 73 disposed inside the curve to be formed and an elastic roller 74 disposed outside the curve to be formed.

The first metal roller 73 is rotatably driven by a rotation drive, not shown, in the same direction as the direction of winding-up performed by the core member 6. A urethane roller, for example, may be used as the elastic roller 74. The elastic roller 74 is adapted to be reciprocally movable, by a drive unit, not shown, in the inner and outer direction of the curve to be formed, i.e. in the direction in which the elastic roller 74 approaches to and is distanced from the metal roller 73.

In the curve forming performed in the curve forming unit 7, the turn portions 44 of the integrated body 47 are sandwiched between the first metal roller 74 and the elastic roller 74. Then, the elastic roller 74 is pressed toward the first metal roller 73 (inside of the curve) with a predetermined load, while the first metal roller 73 is rotated. Thus, the turn portions 44 can be sandwiched between the first metal roller 73 and the elastic roller 74 with the predetermined load being imposed, while the integrated body 47 is fed in the direction of the core member 6. In this case, the elastic roller 74 is strongly pressed while being elastically deformed by the pressing load against the turn portions 44, which is directed to the first metal roller 73. Resultantly, the pressure produced by the strongly pressed elastic roller 74 is imposed on the turn portions 44 and the turn portions 44 are pressed against the first metal roller 73. Thus, the turn portions 44 are sandwiched between the first metal roller 73 and the elastic roller 74 and pressed therebetween, whereby the turn portions 44 are curve-formed along the curved round shape of the first metal roller 73.

In the third embodiment, control is effected by the control unit to the rotation drive of the core member 6, the conveyance drive of the integrated unit 47, the drive of the curve forming unit 7, and the like. With the control, the integrated body 47 is wound up about the core member 6 as described below to carry out the preliminary alignment and the curve forming of the integrated body 47.

First, the winding end of the integrated body 47 is arranged above the first metal roller 73, the integrated body 47 being in the state where the preliminary alignment members 81 are inserted into the predetermined gaps 472 in the integrated body 47. Then, the elastic roller 74 is shifted toward the first metal roller 73 (inside of the curve) to sandwich the winding end of the integrated body 47 between the first metal roller 73 and the elastic roller 74. Thus, the winding end is imposed with a predetermined load. Subsequently, the integrated body 47 is driven for conveyance, and the feed rollers 85, the core member 6 and the first metal roller 73 are driven for rotation. Thus, continuous operation can be performed for the preliminary alignment in the integrated body 47, the curve forming of the turn portions 44 in the integrated body 47 after the preliminary alignment, and the winding up of the integrated body after the curve forming of the turn portions 44.

According to the curve forming unit 7 of the third embodiment, use of the elastic roller 74 can suppress the damages on the turn portions 44 that could be caused by the curve forming, compared with the case where the turn portions are curve-formed by being sandwiched between metal rollers or the like.

In the method for manufacturing a stator coil according to the third embodiment, the integrated body 47 is continuously wound up about the core member 6. Owing to this, productivity of the stator coil 4 is enhanced compared with the case where pitch-by-pitch winding is carried out.

Description on other portions of the configuration and other advantages is omitted because they are the same as those in the first embodiment.

In the method for manufacturing a stator coil according to the third embodiment, the pitch-by-pitch winding-up step may be employed instead of the continuous winding-up step to wind up the integrated body 47 on an N pitch basis (N is a natural number). In this case, several first metal rollers 73 and elastic rollers 74 having different radius may be prepared to cope with the change of the winding radius, as in the first embodiment, so that the curvature radius R can be changed according to the change in the winding radius r.

(Fourth Embodiment)

Referring to FIG. 17, hereinafter is described a method for manufacturing a stator coil for a rotary electric machine, according to a fourth embodiment.

The method for forming a stator coil of the fourth embodiment shown in FIG. 17 is different from the configuration of the first embodiment in that the configuration of the curve forming unit 7 has been changed.

This curve forming unit 7 includes the first metal roller 73 disposed inside the curve to be formed, and second and third metal rollers 75, 76 disposed outside the curve to be formed.

The first metal roller 73 is driven for rotation by a rotation drive, not shown, in the same direction as the direction of winding up performed by the core member 6. The second and third metal rollers 75, 76 are adapted to be reciprocally movable by a drive, not shown, in the inner and outer direction of the curve to be formed, i.e. in the direction in which the second and third metal rollers approach to and are distanced from the metal roller 73.

Curve forming of the turn portions 44 in the curve forming unit 7 is carried out as described below. Specifically, the second and third rollers 75, 76 disposed outside the curve to be formed are pressed toward the first metal roller 73 (inside the curve) with a predetermined load, while the first metal roller 73 is rotated. Thus, the turn portions 44 can be sandwiched between the first metal roller 73 and the second and third metal rollers 75, 76 to impose pressure, while the integrated body 47 is fed in the direction of the core member 6. Thus, the turn portions 44 are sandwiched between the first metal roller 73 and the second and third metal rollers 75, 76 and pressed therebetween, whereby the turn portions 44 are curve-formed along the curved round shape of the first metal roller 73.

According to the curve forming unit 7 of the fourth embodiment, use of the second and third metal rollers 75, 76 together with the first metal roller 73 can lengthen the life of the rollers, compared with the case where a urethane roller, for example, is used.

Description on other portions of the configuration and other advantages is omitted because they are the same as those in the first and the third embodiments.

In the method for manufacturing a stator coil of the fourth embodiment as well, the pitch-by-pitch winding-up step may be employed instead of the continuous winding-up step, as in the third embodiment.

(Fifth Embodiment)

Hereinafter is described a method for manufacturing a stator coil for a rotary electric machine, according to a fifth embodiment.

The method for manufacturing a stator coil according to the fifth embodiment is different from the first embodiment in the integrating step. Specifically, in the method for manufacturing a stator coil according to the first embodiment, the method of the fifth embodiment forms the integrated body 47 by stacking twelve shaped wire members so that the order of superposing the linear superposition portions 471 in the superposing direction will not be changed.

Such an integrated body 47 can facilitate the integrating step. Other portions of the configuration and the advantages are the same as those in the first embodiment.

(Sixth Embodiment)

Hereinafter is described a method for manufacturing a stator coil for a rotary electric machine, according to a sixth embodiment.

In the method for manufacturing a stator coil according to the first embodiment, the method for manufacturing a stator coil according to the sixth embodiment is different from the first embodiment in the integrating step and the winding-up step.

At the integrating step here, two sets of six shaped wire members are prepared. In each set, six shaped wire members are stacked so that the order of superposing the linear superposition portions 471 in the superposing direction will not be changed. A single integrated body is formed by stacking the twelve shaped wire members so that the order of superposing the linear superposition portions 471 in the superposing direction will not be changed, while the winding up is performed at the winding-up step described below.

At the winding-up step, the stacks of the six shaped wire members are directed to the same positions of the core member 6 from a predetermined plurality of directions, for winding about the core member 6 to thereby form the wound body 48.

At this winding-up step, two stacks may be prepared, in each of which the six shaped wire members are stacked so that the order of superposing the linear superposition portions 471 in the superposing direction will not be changed. Then, the two stacks may be directed to different predetermined plurality of positions of the core member 6 from predetermined two directions, for winding about the core member 6 to thereby form the wound body 48.

In the above, the twelve shaped wire members have been divided into two, each including six shaped wire members, but the number of division is not limited to two. Other portions of the configuration and advantages are the same as those in the first embodiment.

(Other Embodiments)

The first to sixth embodiments have described examples in each of which the integrated body 47 is obtained by forming pairs of shaped wire members, each pair being shaped from two electrically conductive wires whose ends are joined to each other, and by integrating six pairs of such wires with each other. This however is not intended to impose a limitation.

For example, each pair of wires may include a first wire portion as a single shaped wire member shaped from one electrically conductive wire, and a second wire portion as a single shaped wire member shaped from one electrically conductive wire, the first and second wire portions being independent of each other. Alternatively, each pair of wires may consist of a single shaped wire member shaped from a single electrically conductive wire including continuous first and second wire portions.

The first and second embodiments have described examples of the pitch-by-pitch winding-up step. In the pitch-by-pitch winding-up step, the integrated body 47 has been fed to the core member 6 on one pitch (the interval between adjacently located linear superposition portions 471 in the integrated body 47) basis, so that the integrated body 47 can be wound up about the core member (cored bar) 6. This however is not intended to impose a limitation. Particularly, the number of feeding pitches in the pitch-by-pitch winding-up step is not limited to one, but may be two or more pitches. Thus, the pitch-by-pitch winding-up step may be an N-pitch based pitch-by-pitch winding-up step in which the integrated body 47 is fed to the core member 6 based on N times (N is a natural number) of the interval between the adjacently located linear superposition portions 471.

The first to sixth embodiments have described examples in each of which preliminary alignment is effected to the integrated body 47, followed by curve forming of the turn portions 44. However this is not intended to impose a limitation. For example, the preliminary alignment may be effected after the curve forming of the turn portions 44, or the preliminary alignment may be effected both before and after the curve forming.

The first to sixth embodiments have described examples in each of which the curvature radius R substantially coincides with the winding radius r at the winding-up step. The curvature radius R is used for the curve forming with plastic deformation during conveyance of the integrated body 47 for feeding to the core member 6. The winding radius r is used in winding the turn portions 44 of the integrated body 47 about the core member 6. However, a relationship expressed by $R \leq r$ may only have to be established between the curvature radius R and the winding radius r. With this configuration, the turn portions 44 are curve-formed into the curved round shape with the curvature radius R corresponding to the winding radius equals to or less than r. Thus, the turn portions 44 can be curve-formed with plastic deformation, independent of the winding up of the integrated body 47 about the core member 6. Therefore, the turn portions 44 having the staircase portions can be reliably and easily curve-formed into the curved round shape having the predetermined curvature radius R. In this way, the core member 6 can wind up the integrated body 47 whose turn portions 44 have already been curve-formed into the curved round shape having the curvature radius R with the winding radius equals to or less than r. Thus, the integrated body 47 can be reliably wound up about the core member 6. It is preferred that the curvature radius R and the winding radius r have a relationship expressed by $R<r$. With this configuration, the integrated body 47 can be more reliably wound around the core member 6.

What is claimed is:

1. A method for manufacturing a stator coil loaded on a rotary electric machine, the stator coil being wound with a plurality of phase windings, comprising:
   a shaping step of shaping a plurality of shaped wire members from electrically conductive wires;
   an integrating step of integrating a plurality of the shaped wire members to form an integrated body; and
   a winding-up step of winding up the integrated body about a core member to form a wound body,
   the shaped wire members each having a plurality of linear portions extending parallel to each other and being juxtaposed in a longitudinal direction of the integrated body, and a plurality of turn portions for connecting the adjacent linear portions with each other alternately at one end side and at the other end side of the linear portions, and
   the shaped wire members each having a plurality of linear superposition portions in the longitudinal direction of the integrated body, the linear superposition portions each being formed by superposing the linear portions with each other;
   the wound body formed in the winding-up step having a plurality of linear stack portions in a circumferential direction of the wound body, the linear stack portions each being formed by stacking a plurality of the linear superposition portions in a radial direction,
   wherein the winding-up step comprises a step of performing curve forming by inserting and withdrawing preliminary alignment members into and from respective gaps formed between the linear superposition portions adjacent to each other in the integrated body such that the turn portions of the integrated body are plastically deformed into a curved shape, during conveyance of feeding the integrated body to the core member.

2. The method for manufacturing a stator coil according to claim 1, wherein, at the winding-up step, the integrated body is wound about the core member by a plurality of number of turns to obtain the wound body, the curvature radius R being changed in accordance with the winding radius that changes with each turn.

3. The method for manufacturing a stator coil according to claim 2, wherein the curve forming is performed by sandwiching the turn portions of the integrated body between a convex tool having a convex curve-forming face and a concave tool having a concave curve-forming face.

4. The method for manufacturing a stator coil according to claim 3, wherein the turn portions are sandwiched between the convex curve-forming face and the concave curve-forming face, with an elastically deformable convex pressing plate for covering the convex curve-forming face being interposed between the convex curve-forming face and the return portions, and an elastically deformable concave pressing plate for covering the concave curve-forming face being interposed between the concave curve-forming face and the return portions.

5. The method for manufacturing a stator coil according to claim 4, wherein:
   at least one of the convex tool and the concave tool has an alignment pin that can be inserted into a gap formed between the linear superposition portions adjacent to each other in the integrated body; and
   the turn portions are sandwiched between the convex curve-forming face and the concave curve-forming face, with the insertion of the alignment pin into the gap.

6. The method for manufacturing a stator coil according to claim 2, wherein the curve forming is performed by sandwiching the turn portions of the integrated body between a first metal roller disposed inside a curve to be formed, and an elastic roller disposed outside the curve to be formed, for the application of a pressure.

7. The method for manufacturing a stator coil according to claim 2, wherein the curve forming is performed by sandwiching the turn portions of the integrated body between a first metal roller disposed inside a curve to be formed, and second and third metal rollers disposed outside the curve to be formed, for the application of a pressure.

8. The method for manufacturing a stator coil according to claim 1, wherein the curve forming is performed by sandwiching the turn portions of the integrated body between a convex tool having a convex curve-forming face and a concave tool having a concave curve-forming face, for the application of a pressure.

9. The method for manufacturing a stator coil according to claim 8, wherein the turn portions are sandwiched between the convex curve-forming face and the concave curve-forming face, with the interposition of an elastically deformable convex pressing plate for covering the convex curve-forming face between the convex curve-forming face and the turn portions, and the interposition of an elastically deformable concave pressing plate for covering the concave curve-forming face between the concave curve-forming face and the turn portions.

10. The method for manufacturing a stator coil according to claim 9, wherein:
    at least one of the concave tool and the convex tool has an alignment pin that can be inserted into a gap formed between the linear superposition portions adjacent to each other in the integrated body; and
    the turn portions are sandwiched between the convex curve-forming face and the concave curve-forming face, with the insertion of the alignment pin into the gap.

11. The method for manufacturing a stator coil according to claim 1, wherein the curve forming is performed by sandwiching the turn portions of the integrated body between a first metal roller disposed inside a curve to be formed, and an elastic roller disposed outside the curve to be formed, for the application of a pressure.

12. The method for manufacturing a stator coil according to claim 1, wherein the curve forming is performed by sandwiching the turn portions of the integrated body between a first metal roller disposed inside a curve to be formed, and second and third metal rollers disposed outside the curve to be formed, for the application of a pressure.

* * * * *